US008532299B2

(12) United States Patent
Hara

(10) Patent No.: US 8,532,299 B2
(45) Date of Patent: Sep. 10, 2013

(54) METHOD FOR PRODUCING TWO-DIMENSIONAL CODE AND READER FOR READING THE TWO-DIMENSIONAL CODE

(75) Inventor: Masahiro Hara, Nagoya (JP)

(73) Assignee: Denso Wave Incorporated, Tokyo (JP)

( * ) Notice: Subject to any disclaimer, the term of this patent is extended or adjusted under 35 U.S.C. 154(b) by 1238 days.

(21) Appl. No.: 12/155,018

(22) Filed: May 29, 2008

(65) Prior Publication Data

US 2009/0323959 A1   Dec. 31, 2009

(30) Foreign Application Priority Data

May 29, 2007 (JP) ................................. 2007-142239
May 29, 2007 (JP) ................................. 2007-142240
Feb. 22, 2008 (JP) ................................. 2008-041448

(51) Int. Cl.
*H04L 29/06* (2006.01)

(52) U.S. Cl.
USPC ......................................................... 380/277

(58) Field of Classification Search
USPC .................................................... 380/28, 277
See application file for complete search history.

(56) References Cited

U.S. PATENT DOCUMENTS

| | | | | |
|---|---|---|---|---|
| 2001/0046296 | A1* | 11/2001 | Katayanagi et al. | 380/210 |
| 2006/0138242 | A1* | 6/2006 | Sandrini et al. | 235/487 |
| 2006/0232662 | A1* | 10/2006 | Otaka et al. | 348/14.01 |
| 2007/0092105 | A1* | 4/2007 | Chiba et al. | 382/100 |
| 2007/0233612 | A1* | 10/2007 | Barrus et al. | 705/71 |

FOREIGN PATENT DOCUMENTS

| | | |
|---|---|---|
| EP | 1 548 641 A1 | 8/2003 |
| EP | 1548641 A1 * | 6/2005 |
| JP | A-2004-147006 | 5/2004 |

OTHER PUBLICATIONS

Extended European Search Report dated Sep. 15, 2008 in corresponding European patent application No. 08009853.6-2210.
Herriot, Robert, *The MIME Multipart/interleaved and Application/Chunk Content-types*, Xerox Corp, Mar. 23, 2001.
Moore, Keith, *Multipart/ References MIME Content-Type*, University of Tennessee, Oct. 24, 1993.
Seino et al., *Development of the Traceability System which Secures the Safety of Fishery Products using the QR Code and a Digital Signature*, IEEE, 2004.
Maruyama et al., *Element-Wise XML Encryption*, IBM Research, Apr. 19, 2000.
Official Communication dated Aug. 20, 2012 in corresponding EP Patent Application No. 08 009 853.6-2210.

* cited by examiner

*Primary Examiner* — Philip Chea
*Assistant Examiner* — Kendall Dolly
(74) *Attorney, Agent, or Firm* — Posz Law Group, PLC

(57) ABSTRACT

A method of producing a two-dimensional code having a code area in which data codes coded as codewords are mapped. First type of data codes is mapped in the code area. The first type of data codes are coded as the codewords and indicating data to be disclosed. An end identification code is added to an end of a code string composed of the first type of data codes, the end identification code showing the end. Second type of data codes are mapped after the end identification code in the code area, the second type of data codes being coded as the codewords and indicating data to be kept in secret. Filler codes showing no data after the second type of data codes are mapped to fill up the code area, when a total amount of the codewords in the code area is less than a capacity of the code area.

48 Claims, 22 Drawing Sheets

| DISCLOSURE DATA CODE A | DISCLOSURE DATA CODE B | END ID CODE | SECRET ID CODE | DATA LENGTH | SECRET DATA CODE α | SECRET DATA CODE β | FILLER CODE | ERROR CORRECTION CODE |
|---|---|---|---|---|---|---|---|---|

FIG.3A

| DISCLOSURE DATA A | SECRET DATA α | DISCLOSURE DATA B | SECRET DATA β |

FIG.3B

| DISCLOSURE DATA A | DISCLOSURE DATA B | SECRET DATA α | SECRET DATA β |

FIG.3C

| DISCLOSURE DATA CODE A | DISCLOSURE DATA CODE B | END ID CODE | SECRET ID CODE | DATA LENGTH | SECRET DATA CODE α | SECRET DATA CODE β | FILLER CODE | ERROR CORRECTION CODE |

FIG.3D

| START POSITION | TEXT LENGTH | ENCRYPTED DATA | ENCODING KEY DETECTION DATA |

FIG.3E

| START POSITION | TEXT LENGTH | ENCRYPTED DATA | ENCODING KEY |

FIG.3F

| START POSITION | TEXT LENGTH | PLAIN TEXT DATA |

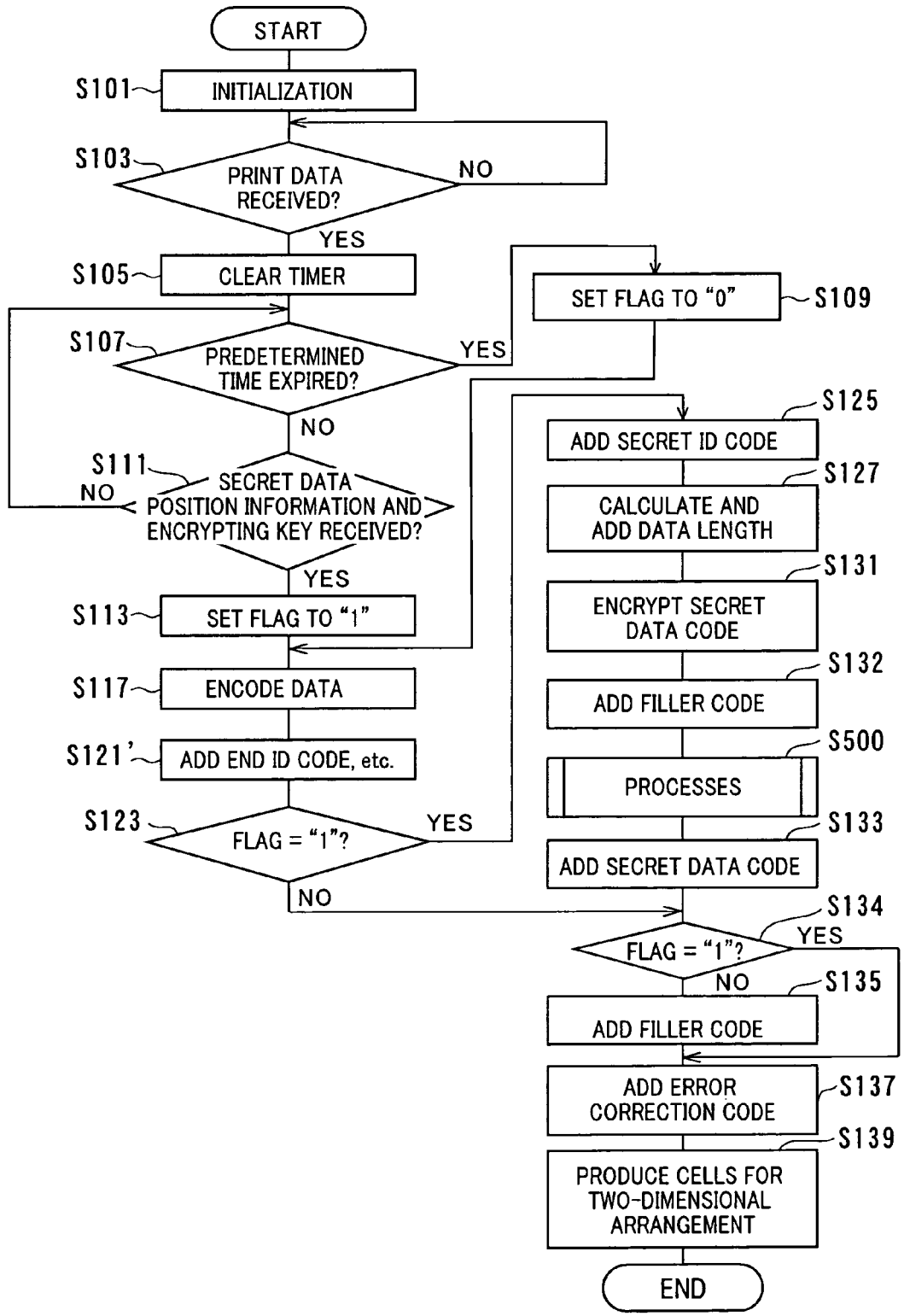

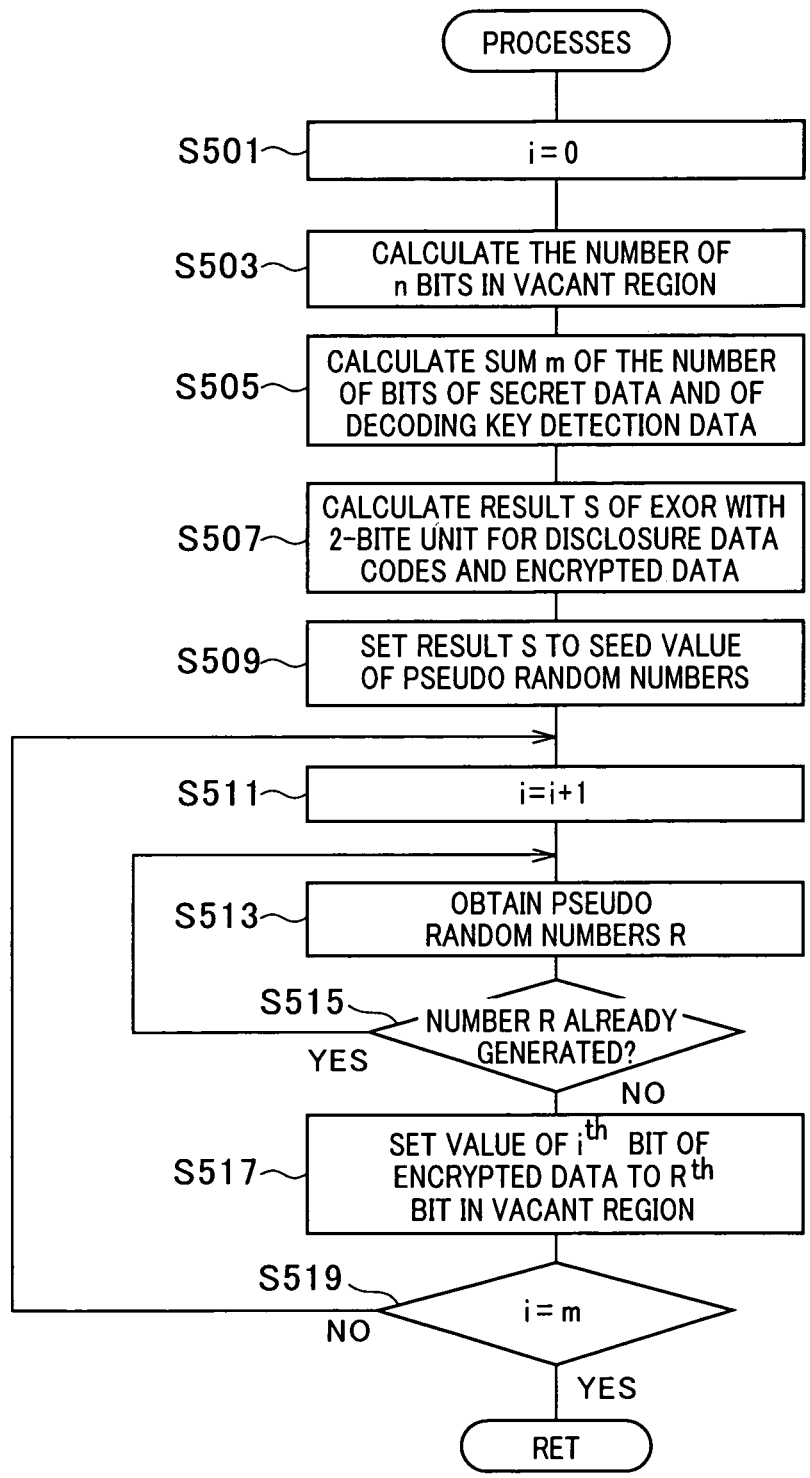

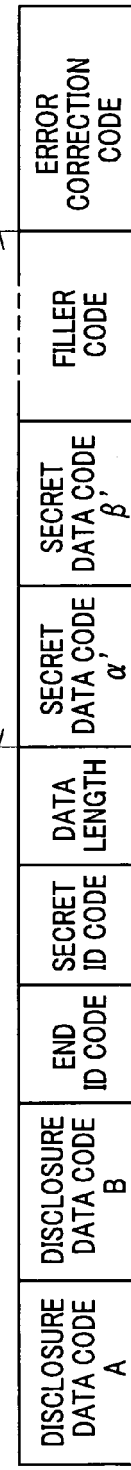

METHOD FOR PRODUCING TWO-DIMENSIONAL CODE AND READER FOR READING THE TWO-DIMENSIONAL CODE

CROSS-REFERENCE TO RELATED APPLICATION

This application is based on and claims the benefit of priorities from earlier Japanese Patent Application Nos. 2007-142239 filed May 29, 2007; 2007-142240 fined on May 29, 2007; and 2008-041448 filed Feb. 22 2008, respectively, the descriptions of which are incorporated herein by reference.

BACKGROUND OF THE INVENTION

1. Technical Field of the Invention

The present invention relates to a method for producing two-dimensional code which contains data desired to be concealed or kept in secret (hereinafter referred to as "secret data" or "data to be kept in secret"), and a reader for reading the two-dimensional code.

2. Background Art

Techniques for producing and reading two-dimensional codes which contain secret data are known. For example, Japanese Patent Publication (Laid-Open) No. 2004-147006 discloses an invention entitled "Information transmission method and mobile unit". In this prior art technique, a transmission side mobile unit encrypts transmission data using encrypting keys entered through a key input device, converts the encrypted data into a QR (quick response) code serving as a two-dimensional code, and indicates the QR code on a display.

On the other hand, a reception side mobile unit reads through a camera, for example, the image of the QR code indicated on the display of the transmission side mobile unit and determines whether or not the QR code is encrypted. If yes, the encrypting keys are demanded. Then, the QR code is reverse-converted while the transmission data is decrypted using the inputted encrypting keys to indicate the decrypted data on a display.

However, according to the "Information transmission method and mobile unit" disclosed in Japanese Patent Publication (Laid-Open) No. 2004-147006, when the encrypted data have been reverse-converted into a QR code, the encrypted data per se indicated on the display such as of a mobile unit usually make no sense as character information, or on the contrary, the information may correspond to control codes that would influence the screen display control.

If the information indicated on the display makes no sense, the user of the mobile unit, for example, may have mistrust. Probably, this may inadvertently motivate a user who can recognize the information as being encrypted, to make an attempt to decrypt the information, causing a problem of security.

In addition, if the information corresponds to control codes, the screen view may be distorted, possibly leading to other system problems.

SUMMARY OF THE INVENTION

The present invention has been made in light of the problems described above, and has as its object to provide a method for producing a two-dimensional code, which cannot permit a user who reads the code with a general purpose reader to recognize the presence of secret data. A further object of the present invention is to provide a reader for reading the two-dimensional code, which is able to decode the data codes residing in a vacant portion of a code region where codewords are to be mapped.

In order to achieve the above method, the present invention provides, as one aspect, a method of producing a two-dimensional code having a code area in which data codes coded as codewords are mapped, comprising steps of: first mapping first type of data codes in the code area, the first type of data codes being coded as the codewords and indicating data to be disclosed; adding an end identification code to an end of a code string composed of the first type of data codes, the end identification code showing the end; second mapping second type of data codes after the end identification code in the code area, the second type of data codes being coded as the codewords and indicating data to be kept in secret, and third mapping filler codes showing no data after the second type of data codes to fill up the code area, when a total amount of the codewords in the code area is less than a capacity of the code area.

Thus, secret data codes which are encoded as codewords representing data to be kept in secret are located after an end ID (identification) code, replacing a part or all of the filler codes. Generally, a two-dimensional code reader is configured covering an algorithm specification in which two-dimensional codes are decoded by reading data codes located in a code region from its head to its end ID code indicating the end of the code string. Therefore, filler codes, for example, which are usually located after the end ID code are excluded from reading. Thus, the data codes located after the end ID code, replacing a part or all of the filler codes, are not decoded in a general purpose reader even if the data codes are readable codewords. Accordingly, by locating the data codes to be kept in secret (secret data codes) after the end ID code, the secret data codes can be prevented from being read, although the data codes located before the end ID code can be read. Thus, reading a two-dimensional code containing such secret data codes using a general purpose reader may not allow the user of the reader to notice the presence of the data to be kept in secret by the secret data codes.

It is preferred that the method comprises a step of determining whether or not the second type of data codes should be mapped in the code area. In this case, it is also preferred that the method comprises a step of mapping a secret indemnification code between the end identification code and the second type of data codes to show that the data codes succeeded from the secret identification codes are the second type of data codes. For example, the second mapping step includes a step of encrypting the second type of data code.

For example, the second type of data codes may include information specifying a key to decrypt the encrypted second type of data codes. Alternatively, the second type of data codes may include a key to decrypt the encrypted second type of data codes.

It is preferred that the second type of data codes are composed of a plurality of data codes encrypted on different keys, code by code, and each encrypted data code includes information specifying a key to decrypt each encrypted data code. The second type of data codes may be composed of a plurality of data codes encrypted on different keys, code by code, and each encrypted data code includes a key to decrypt each encrypted data code.

For example, it is also preferred that when the data to be disclosed and the data to be kept in secret are positionally mixed to be back-and-forth in data records before being coded into the codewords, the second type of data codes include information showing a positional relationship in the data records.

In order to achieve the foregoing reader, as another aspect, the present invention provides an apparatus for reading a two-dimensional code having a code area in which data codes coded as codewords showing data are mapped, wherein an end identification code showing an end of a code string composed by the mapped data codes is added to the end of the code string and filler codes showing no data are mapped after the code string to fill up the code area when a total amount of the codewords in the code area is less than a capacity of the code area, the apparatus comprising: first decoding means for decoding a first type of data codes which are the data codes mapped before the end identification code; data code determining means for determining whether or not there is a second type of data codes which are mapped after the end identification code, and; second decoding means for decoding the second type of data codes when it is determined by the data code determining means that the there are mapped the second type of data codes.

In this case, the data code determining means determines whether or not second data codes are located after the end ID code. If it is determined that the second data codes are located, the first decoding means decodes the first data codes, while the second decoding means decodes the second data codes. Thus, in the case where the second data codes are located in the code region after the end ID code (vacant portion of the code region) where only filler codes should originally be located, the second data codes can be decoded. In this way, the data codes in the vacant portion of the code region where codewords should be located, can be decoded.

Another aspect, the present invention provides a method of producing a two-dimensional code having a code area in which data codes coded as codewords are mapped, comprising steps of: first mapping first type of data codes in the code area, the first type of data codes being coded as the codewords and indicating data to be disclosed; adding i) an end identification code to an end of a code string composed of the first type of data codes, the end identification code showing the end, or ii) end identification information to a predetermined position in the code string, the end identification information specifying an end position of the code string, when a total amount of the codewords in the code area is less than a capacity of the code area; and second mapping second type of data codes after i) the end identification code in the code area, the second type of data codes being coded as the codewords and indicating data to be kept in secret, or ii) the end position of the code string specified by the end identification information.

Still another aspect, the present invention provides a method of producing a two-dimensional code having a code area in which data codes coded as codewords are mapped, comprising steps of: first mapping first type of data codes in the code area, the first type of data codes being coded as the codewords and indicating data to be disclosed; adding i) an end identification code to an end of a code string composed of the first type of data codes, the end identification code showing the end, or ii) end identification information to a predetermined position in the code string, the end identification information specifying an end position of the code string, when a total amount of the codewords in the code area is less than a capacity of the code area; and second mapping second type of data codes after i) the end identification code in the code area, the second type of data codes being coded as the codewords, being subjected to a predetermined process, and indicating data to be kept in secret, or ii) the end position of the code string specified by the end identification information.

Still another aspect, the present invention provides a method of producing a two-dimensional code having a code area in which data codes coded as codewords are mapped, the data codes including first type of data codes to be disclosed and second type of data codes to be kept in secret, comprising steps of: placing an end identification code at a start position of the code area, the end identification code showing an end of a code string composed of a first type of data codes to be disclosed; mapping the second type of data codes after the end identification code in the code area; and mapping filler codes after the second type of data codes to fill up the code area, the filler codes being a filler other than data, when a total amount of the codewords in the code area is less than a capacity of the code area.

BRIEF DESCRIPTION OF THE DRAWINGS

In the accompanying drawings:

FIGS. 3A to 3F are explanatory views illustrating examples of formats for data and codes which are subjected to information processing in the code producing processes illustrated in FIG. 2;

FIG. 12 is a flow diagram illustrating a flow of code producing processes executed by a QR code printer, according to a fifth embodiment of the present invention;

FIG. 13 is a flow diagram illustrating the particular processes of FIG. 12;

FIGS. 14A to 14E are explanatory views illustrating examples of codes which are subjected to information processing in the particular processes of FIG. 13;

DETAILED DESCRIPTION OF THE PREFERRED EMBODIMENTS

With reference to the accompanying drawings, hereinafter will be described some embodiments of a method for producing a two-dimensional code and a reader for reading the two-dimensional code. In each of the following embodiments, a QR (Quick Response) code is presented as an example of the two-dimensional code. It should be appreciated, however, that the two-dimensional code associated with the present invention is not limited to such a QR code, but that, similar to the QR code, the present invention can be applied, for example, to data matrixes, Maxicodes, CP codes, PDF 417 and RSS composites.

First Embodiment

Figure 1A:
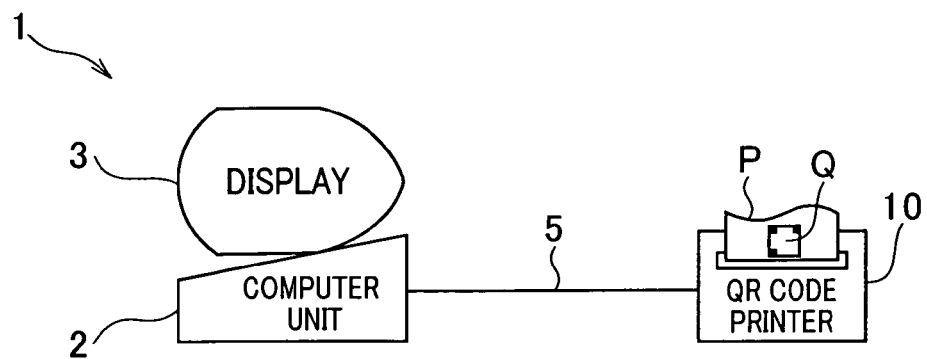
FIG. 1A is an explanatory view illustrating a QR code printer and a computer connected to the printer, according to a first embodiment of the present invention.
Figure 1B:
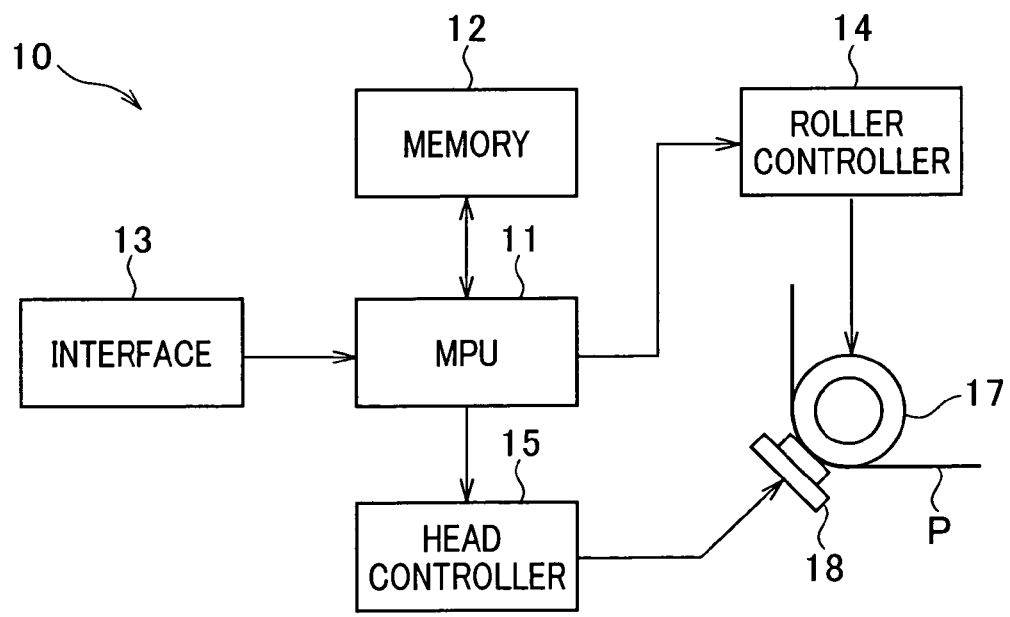
FIG. 1B is a block diagram illustrating an example of a hardware configuration of the QR code printer, according to the first embodiment.

Referring to FIGS. 1A and 1B, a configuration of a QR code printer 10 according to a first embodiment of the present invention will now be described.

FIG. 1A is an explanatory view illustrating the QR code printer 10 according to the first embodiment and a personal computer (hereinafter referred to as a "computer") 1. FIG. 1B is a block diagram illustrating an example of a hardware configuration of the QR code printer 10.

As shown in FIG. 1A, the QR code printer 10 is connected to the computer 1 through a cable 5. Thus, the QR code printer 10 has functions, for example, of producing a QR code based on character data, such as alphameric characters, Japanese characters (Kanji) and symbols (these data are hereinafter collectively referred to as "print data") inputted from the computer 1, and printing the produced QR code on a label P. The "QR code" here is based on the two-dimensional code symbol—QR code—basic specification (JIS X 0510:2004) of Japanese Industrial Standard (JIS).

The computer 1 includes a computer unit 2 and a display 3. The computer unit 2 is an information processor including an MPU, main memory (main storage unit), hard disc (auxiliary storage unit), input/output interface, communication interface, keyboard and pointing device, which are all not shown. The display 3 is an information displaying apparatus connected to the computer unit 2 to indicate the information outputted from the computer unit 2 on a screen.

A device driver of the QR code printer 10 is installed (incorporated) in the computer unit 2. This enables the computer unit 2 to optionally output to the QR code printer 10 a print data that contains characters, for example, which the user of the computer 1 wishes to print on the label P in the form of the QR code.

As shown in FIG. 1B, the QR code printer 10 mainly includes an MPU 11, memory 12, interface 13, roller controller 14, head controller 15, roller 17 and head 18. These components are mounted on a printed circuit board, not shown, or arranged in a housing, not shown.

The MPU 11 is a microcomputer which is able to totally control the QR code printer 10. The MPU 11 can constitute the information processor together with the memory 12 connected through a memory bus, and has an information processing function. The MPU 11 is connected not only to the memory 12, but also to the interface 13, the roller controller 14 and the head controller 15. Code producing processes that will be described later are executed by the MPU 11 and the memory 12.

The memory 12 is a semiconductor memory device which corresponds, for example, to an RAM (DRAM, SRAM, etc.) and an ROM (EPROM, EEPROM, etc.). The RAM in the memory 12 is configured so that some regions can be ensured therein, the regions including a buffer region for storing character data transmitted from the computer 1, or an operation region which is utilized by the MPU 11 when performing processes, such as arithmetic operation and logic operation. Programs are preset in the ROM. The programs include a given program that can execute code producing processes, for example, which will be described later, and a system program that can control various pieces of hardware, such as the roller controller 14 and the head controller 15.

The interface 13 is an input interface for enabling reception of the print data, for example, transmitted from the computer unit 2 of the computer 1. The interface 13 is connected to the MPU 11 through a serial bus, for example. The print data inputted to the MPU 11 through the interface 13 is subjected to information processing and encoded, as will be described later, by the code producing processes.

The roller controller 14 serves as a control unit that can control the drive mechanism (not shown) of the roller 17 and is connected to the MPU 11 through the serial bus, for example. Thus, in response to the signals received from the MPU 11, the roller 17 is controlled, for example, as to its start and stop or its rotational direction.

The head controller 15 is a thermal head, for example, which can print any pattern on a label made of heat sensitive paper, and is connected to the MPU 11 through the serial bus, for example. In the present embodiment, the head controller 15 enables printing of the QR code produced in the code producing processes that will be described later, on the heat sensitive label. Specifically, the head controller 15 allows printing of the QR code on the label in synchronization with the transmission timing of the heat sensitive label, which timing is produced by the roller controller 14. The QR code includes, for example, a position detection pattern, a timing pattern or a data code.

Hereinafter, a description will be given exemplifying a case of a thermal head playing the roll of the head controller 15. However, any head, such as an inkjet head or a dot impact head, may serve as the head controller 15 if only the head can print the QR code. Also, any printing mechanism may be used, such as a laser printer or an LED printer.

Thus, according to the QR code printer 10 configured as described above, the print data outputted from the computer 1 and inputted to the QR code printer 10 is temporarily stored in the buffer region of the memory 12 through the interface 13, and then subjected to the code producing processes described below.

Figure 2:
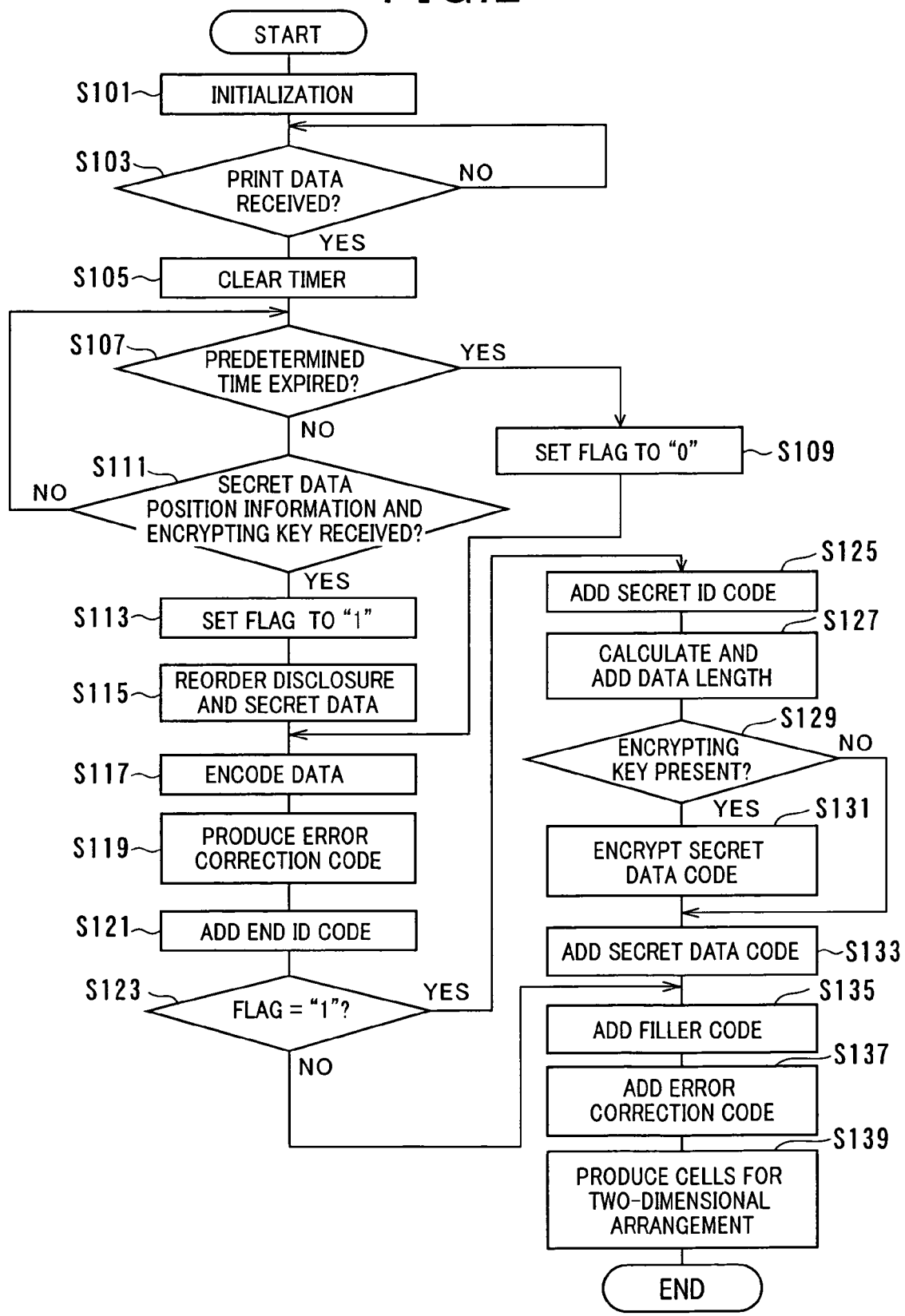
FIG. 2 is a flow diagram illustrating a flow of code producing processes executed by the QR code printer, according to the first embodiment.
Figure 4:
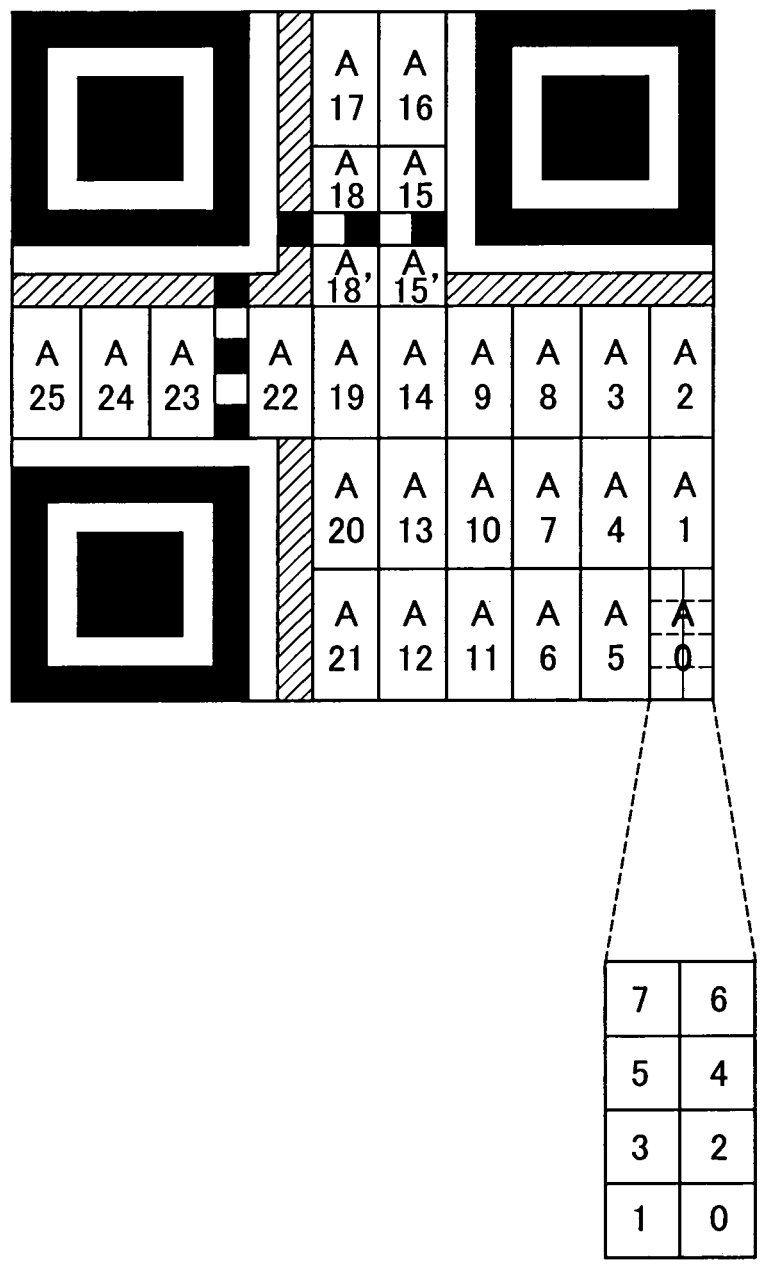
FIG. 4 is an explanatory view illustrating an example of a configuration of a QR code of type 1.

With reference to FIGS. 2 to 4, hereinafter is described the code producing processes. FIG. 2 is a flow diagram illustrating a flow of the code producing processes. FIGS. 3A to 3F illustrate examples of formats of the data and codes subjected to information processing in the code producing processes illustrated in FIG. 2. In particular, FIG. 3A is an example of data record of print data, FIG. 3B is an example of reordered data record, FIG. 3C is an example after addition of codes, FIG. 3D is an example of a configuration of the secret code illustrated in FIG. 3C, FIG. 3E is another example of a configuration of the secret code illustrated in FIG. 3C, and FIG. 3F is still another example of a configuration of the secret code illustrated in FIG. 3C. FIG. 4 illustrates an example of a configuration of a QR code of type 1.

As shown in FIG. 2, the code producing processes is started by the MPU 11 and the memory 12 which are activated by turning on the power of the QR code printer 10. First, initialization is performed at step S101. In this process, the operation region and the buffer region for storing data in the memory 12 are cleared, or predetermined flags, counters and the like, in the memory 12 are cleared.

At step S103, it is determined whether or not the print data have been received. This step is repeated until the print data are received ("No" at step S103). When the print data are determined as having been received ("Yes" at step S103), control proceeds to the subsequent step S105 where the count value of a timer is cleared. The timer whose count value is cleared at step S105 measures passage of predetermined time at the subsequent step S107.

At step S107, the timer mentioned above determines whether or not the predetermined time has expired. Specifically, it is required, at the subsequent step S111, to determine whether or not data concerning encryption, for example, are included in the print data transmitted from the computer 1. In this regard, the timer determines, at step S111, for example, whether or not predetermined time of one second has expired. If the data concerning encryption is not transmitted from the computer 1 by the expiration of the time, control proceeds to step S109 upon expiration of the predetermined time ("Yes" at step S107).

If the predetermined time has not expired ("No" at step S107), it is determined, at the subsequent step S111, whether or not data concerning encryption, for example, have been received, which data including: secret data position information which indicates a positional relationship of the data to be kept in secret (hereinafter referred to as "secret data") in the data record; and an encrypting key used for encryption. When these data are determined as having been received ("Yes" at step S111), control proceeds to the subsequent step S113. When these data are determined as not having been received ("No" at step S111), control returns to step S107 described above so that the expiration of the predetermined time can again be determined.

Then, when the predetermined time is determined, at step S107, as having expired ("Yes" at step S107), a predetermined flag is set to "0" at step S109. This flag indicates whether or not the secret data are included in the print data. If the flag is set to "0", it means that the secret data are not included in the print data. If the flag is set to "1", it means that the secret data are included in the print data. Thus, if it is determined, at step S111, that the data concerning encryption and the like have been received ("Yes" at step S111), the flag is set to "1" at the subsequent step S113.

After setting "1" to the predetermined flag at step S113, disclosure data and secret data are reordered at the subsequent step S115. Specifically, the print data may include data to be disclosed to a third party (disclosure data) and data to be kept in secret to a third party (secret data), and these data may be disorderly present in the data record. In such a case, the order of the data is reordered on the basis of the "position information indicating a positional relationship of the secret data in the data record" received at step S111, in order to group the data into a disclosure data group and a secret data group.

For example, as shown in FIG. 3A, let us assume that the print data record transmitted from the computer 1 includes disclosure data A, secret data α, disclosure data B and secret data β in this order. In this case, these data are reordered at step S115, so as to be arranged in the order of disclosure data A, disclosure data B, secret data α and secret data (as shown in FIG. 3B. Thus, the disclosure data and the secret data are grouped to facilitate the processes, for example, of adding an end ID (identification) code performed at the later step S121, or adding a secret ID code performed at step S125.

At the subsequent step S117, data including the disclosure data and the secret data are encoded according to JIS basic specification (JIS X 0510:2004). This process produces encoded disclosure data codes as codewords representing data to be disclosed (that is, first type of data codes in the present invention), and encoded secret data codes as codewords representing data to be kept in secret (that is, second type of data codes in the present invention).

At the subsequent step S119, an error correction code for each of the disclosure data is produced using, for example, the algorithm of producing an error correction code described in JIS basic specification (JIS X 0510:2004), followed by encoding the produced error correction code. An error correction code for each of the secret data is also produced in the similar manner.

At the subsequent step S121, the end ID code is added after the disclosure data codes. The end ID code has a 4-bit pattern of "0000", for example, and is located immediately after the disclosure data code B which is preceded by the disclosure data code A as shown in FIG. 3C.

At the subsequent step S123, it is determined whether or not the predetermined flag mentioned above has been set to "1", that is, whether or not the print data contain secret data. If secret data are contained (if the flag has been set to "1", which is "Yes" at step S123), control proceeds to step S125. If no secret data are included (if the flag has been set to "0", which is "No" at step S123), a series of secrecy processes (steps S125 to S133) are skipped, and control proceeds to step S135.

Steps S125 to S133 are the series of secrecy processes which are performed in the case where the print data contain the secret data. In such a case, at step S125, the secret ID code is added, first, immediately after the end ID code.

At step S125, by locating the secret ID code immediately after the end ID code, it is explicitly indicated that the data codes located after the end ID code are the "data codes encoded as codewords representing data to be kept in secret". Thus, in decoding the QR code Q produced by the present code producing processes using a QR code reader, for example, the fact that secret data codes are contained in the QR code Q can be recognized. Accordingly, data excluded from reading and garbled data, for example, can be prevented from being read by being erroneously recognized as secret data. In addition, occurrences of malfunction ascribed to the reading based on the erroneous recognition can also be prevented.

At the subsequent step S127, the length of the secret data codes are calculated. The calculated data length is encoded and additionally located immediately after the secret ID code, whereby the region and range where the secret data codes are located can be recognized. Thus, in decoding the QR code Q produced by the present code producing processes using a QR code reader, for example, the range of the secret data codes, or the encrypted data codes, can be recognized.

For example, in the example illustrated in FIG. 3C, a sum of the lengths of the secret data codes α and β is calculated as the data length, which length is then added immediately after the secret ID code.

At the subsequent step S129, a determination is made as to whether or not encrypting keys are present to determine whether or not the secret data codes are required to be encrypted. Specifically, if encrypting keys have been received, at step S111, from the computer 1, it is determined that encrypting keys are present ("Yes" at step S129) and control proceeds to step S131 to perform an encrypting process. If encrypting keys have not been received, at step S111, from the computer 1, it is determined that encrypting keys are not present ("No" at step S129) and control proceeds to step S133, skipping the encrypting process at step S131.

Even when any encrypting keys have not been received at step S111, and if the computer 1 retains the encrypting keys in advance in the information storage medium, such as the memory 12 or the hard disc, it is determined that encrypting keys are present ("Yes" at step S129). In this case as well, control proceeds to step S131 where the encrypting process is performed.

At step S131, the secret data codes are encrypted. In this process, the secret data codes may be encrypted by using, for example, the known composite visual cryptography (composite visual secret distribution process). In this way, security can be enhanced comparing with the case where plain-text data with no encryption is added.

In the example illustrated in FIG. 3D, the secret data code α is encrypted to obtain the "encrypted data", and at the same time a "start position", a "text length" and a "decoding key detection data" are produced. The initially located "start position" is given as the position information of the encrypted secret data. When the head of the print data is imparted with an address zero, a representable address value may correspond to this "start position". The subsequent "text length" is the number of characters of the encrypted secret data. It may sometimes happen that data before being encoded as codewords, may be disorderly located in a positional relationship in the data record. Even in such a case, in decoding the QR code Q produced by the present code producing processes by using a QR code reader, for example, the decoded data can be located in the data record so as to have the positional relationship before encoding, on the basis of the position information described above.

The "decoding key detection data" added last is the key identifying information, with which a decoding key for decrypting the encryption can be identified. When the key cryptography (also referred to as "secret key cryptography") is common between the encrypting keys and the decoding keys, the decoding key detection data can also identify the encrypting keys. Thus, in decoding the QR code Q produced by the present code producing processes by using a QR code reader, for example, the decoding keys (keys enabling decoding) can be readily identified for the secret data codes, or a determination can be made as to whether or not the key in question is a decoding key.

The secret data code β is configured in the similar manner as the secret data code α. The same information as that of the decoding key for decoding the secret data α may be added here so as to serve as the "decoding key detection data". Alternatively, when the secret data of the secret data code β is encrypted using an encrypting key different from that of the secret data code β, different "decoding key detection data" for identifying a decoding key may be added. Thus, in decoding the QR code Q produced by the present code producing processes by using a QR code reader, for example, a key for enabling decoding can be readily identified for the each of the secret data codes, or a determination can be made as to whether or not the key in question is a decoding key.

At step S133, secret data codes are additionally located immediately after the data length. In the example illustrated in FIG. 3D, the secret data codes α and β are additionally located after the data length, so that, in the decoding processes performed by a general purpose two-dimensional code reader, filler codes, for example, located after the end ID code are excluded from reading. Therefore, such secret data codes located after the end ID code cannot be read by the general purpose two-dimensional code reader. Thus, even when a two-dimensional code containing such secret data codes are read by a general purpose reader, the presence of the secret data codes cannot be recognized. Accordingly, the user of the reader would not notice the presence of the secret data.

At the subsequent step S135, filler codes are additionally located after the secret data codes, with reference, for example, to the process algorithm described in ISO 18004 and JIS basic specification (JIS X 0510:2004). This algorithm includes a process of "mapping filler codes showing no data after the data to be kept in secret (the second type of data codes) to fill up the code area, when a total amount of the codewords in the code area is less than a capacity of the code area."

At step S137, an error correction code is also further added. Thus, the data codes in the format illustrated in FIG. 3C can be produced.

At step S139, individual cells are produced on the basis of the data codes produced at step S137, and then located in the data blocks illustrated in FIG. 4. Specifically, the QR code of type 1 illustrated in FIG. 4 is configured to have a square shape whose one side corresponds to 21 cells (modules). Thus, the code region except for position detection patterns provided at the three corners, form information areas (shaded areas in FIG. 4) and timing patterns, is used for locating 26 data blocks (A0-A25) each consisting of 8 cells arranged in 4 lines and 2 rows.

For example, in the example shown in FIG. 3C, the disclosure data code A is arranged in blocks A0 to A2, the disclosure data code B is arranged in blocks A3 to A6, and the end ID code is arranged in block A7. Then, after the end ID code, the secret data codes, the data length, the secret ID code and the like are arranged in blocks A8 to A17 which correspond to the positions where filler codes are normally arranged.

Specifically, the secret ID code is arranged in block A8, the data length is arranged in the following block A9, and the secret data code α is arranged in the following blocks A10 to A13, and the secret data code β is arranged in the following blocks A14 to A17. Then, similar to the normal QR codes, the error correction codes are arranged in the remaining blocks A20 to A25. The filler codes are arranged in the empty portions inbetween, which are blocks A18 and A19. Blocks A15 and A18, which are arranged with a timing pattern being interposed, are divided into blocks A15 and A15', and blocks A18 and A18', respectively.

As shown in FIG. 3E, the decoding keys per se may be added, at step S131, instead of adding the "decoding key detection data". Thus, in decoding the QR code Q produced by the present code producing processes by using a QR code reader, for example, the secret data code α can be decoded to obtain the original plain text, even when, for example, the QR code reader does not have the decoding key for the secret data code α.

Similarly, as to the secret data code β, the decoding key per se may be added instead of adding the "decoding key detection data". The added decoding key may be the same as the one for decoding the secret data code α. Alternatively, when the secret data of the secret data code β is encrypted using an encrypting key different from that of the secret data code α, a different decoding key corresponding to the different encrypting key may be added. Thus, in decoding the QR code Q produced by the present code producing processes by using a QR code reader, for example, the secret data code β can be decoded to obtain the original plain text, even when, for example, the QR code reader does not have the decoding key for the secret data code β.

It may sometimes be determined, at step S123, that the secret data are not present (the flag is set to "0", which is "No" at step S123). In such a case, as illustrated in FIG. 3F, an additional step may be provided between steps S123 and S135. In this additional step, the "start position" and the "text length" that have been added at step S131 may be added before the plain text data which are not encrypted. Also, it may sometimes happen that data before being encoded as codewords, may be disorderly located in a positional relationship of the data record. Even in such a case, in decoding the QR code Q produced by the present code producing processes by using a QR code reader, for example, the decoded data can be located so as to have the positional relationship before encoded, on the basis of the position information.

As described above, in the QR code Q produced by the QR code printer 10 according to the first embodiment, the secret data codes are additionally located, at step S133, after the end ID code, replacing a part or all of the filler codes. Since the secret data codes located after the end ID code are excluded from reading in a general purpose reader, even when the two-dimensional code containing such secret data codes are read by a general purpose reader, the presence of the data to be kept in secret cannot be recognized owing to the secret data codes. Thus, it can be ensured that the user of such a general purpose reader may not notice the presence of the secret data.

Similarly, as to the secret data code β, the decoding key per se may be added instead of adding the "decoding key detection data". The added decoding key may be the same as the one for decoding the secret data code α. Alternatively, when the secret data of the secret data code β is encrypted using an encrypting key different from that of the secret data code α, a different decoding key corresponding to the different encrypting key may be added. Thus, in decoding the QR code Q produced by the present code producing processes by using a QR code reader, for example, the secret data code β can be decoded to obtain the original plain text, even when, for example, the QR code reader does not have the decoding key for the secret data code β.

The first embodiment has been described exemplifying a case where the QR code Q is printed on the label P by the QR code printer 10. The present invention is not limited to this but may involve any components that can visually express the QR code Q.

For example, it may be so configured that the code producing processes illustrated in FIG. 2 are executed by the computer unit 2 to indicate the QR code Q on the display 3. In this case, the following technical idea may constitute:

That is, the technical idea of: "A program for producing two-dimensional codes, the program being for functioning a computer as a two-dimensional code producing device in which, when the total number of disclosure data codes, which are encoded as codewords representing the disclosure data, is less than a value corresponding to a capacity that can be accommodated in the code region for locating the codewords, an end ID code indicating an end of a code string constituted of the disclosure data codes that are located in the code region, is located at an end of the code string, and filler codes representing no data are located in a vacant portion of the code region, characterized in that: secret data codes encoded as codewords representing data to be kept in secret, are located after the end ID code, replacing a part or all of the filler codes".

Thus, with the program for producing two-dimensional codes, the computer functioning as a two-dimensional code producing device may provide the advantages similar to the MPU 11 and the like of the QR code printer 10 described above.

The first embodiment has been described exemplifying a configuration in which the computer 1 is connected to the QR code printer 10 and the print data is transmitted from the computer 1. However, any digital camera, mobile phone or hand-held computer and handy terminal, for example, having such a function may be connected to the QR code printer 10 to obtain the same advantages, if only these devices are information processors capable of outputting character data, such as alphameric characters, Japanese characters (Kanji) and symbols.

Second Embodiment

Hereinafter will be described a second embodiment of the present invention. It should be appreciated that, in the second embodiment and subsequent embodiments, the identical or similar components, portions or processes are given the same reference numerals as those in the first embodiment, for the sake of omitting explanation.

According to the second embodiment, a QR code reader 20 has a configuration which is able to decode the QR code Q printed by the QR code printer 10 described in the first embodiment. Since the configuration of the QR code that can be decoded by the QR code reader 20 has already been described referring to FIGS. 3A to 3F and FIG. 4, the description here is omitted.

Figure 5:
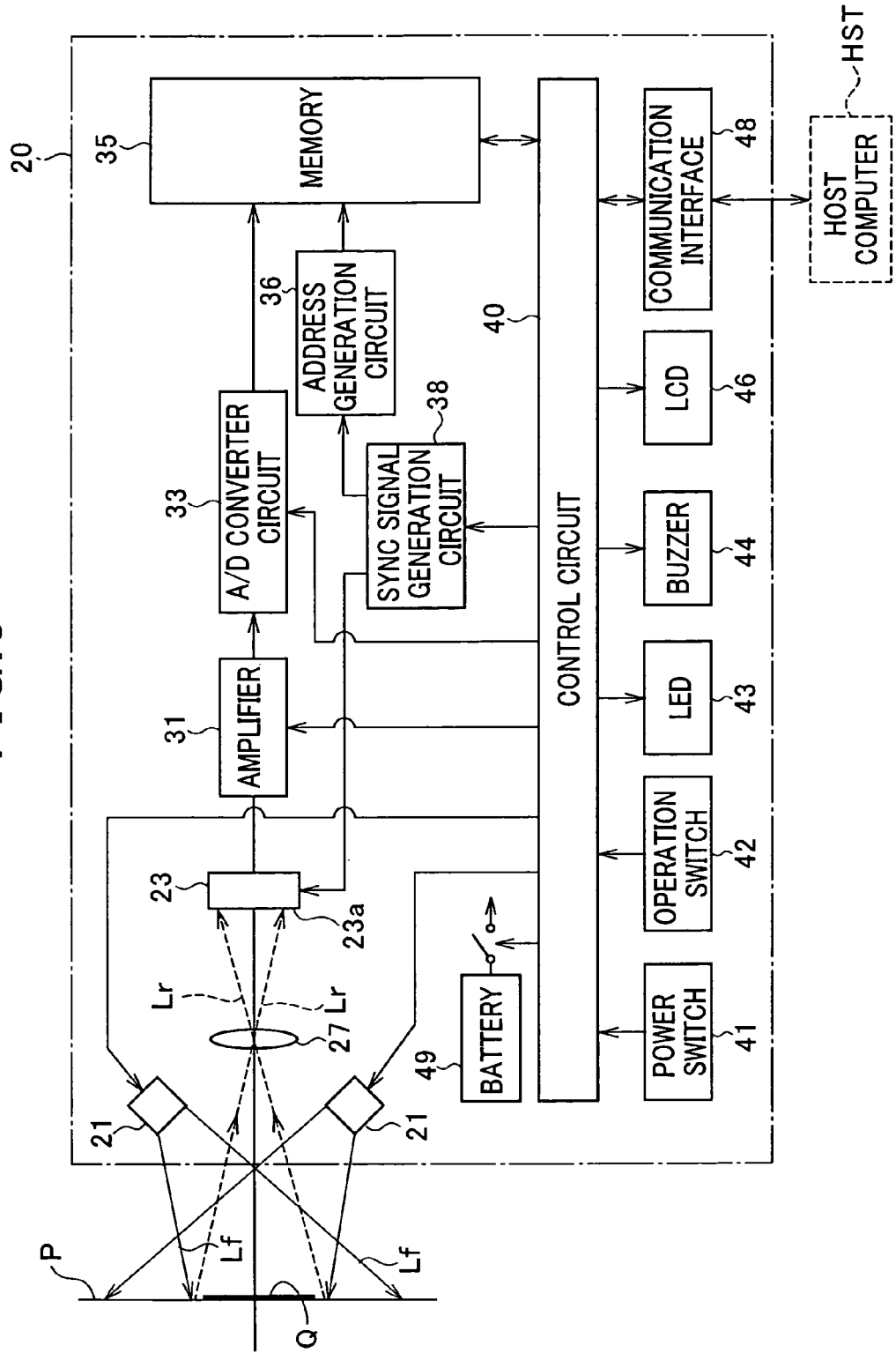
FIG. 5 is a block diagram illustrating an example of a hardware configuration of a QR code reader, according to a second embodiment of the present invention.

Referring to FIG. 5, the configuration of the QR code reader 20 according to the second embodiment of the present invention is described. FIG. 5 is a block diagram illustrating an example of a hardware configuration of the QR code reader according to the second embodiment.

As illustrated in FIG. 5, the QR code reader 20 includes: an optical system having an illumination source 21, a light-receiving sensor 23 and an imaging lens 27; a microcomputer system having a memory 35, a control circuit 40, an operation switch 42 and a liquid crystal display (LCD) 46; and a power source system having a power switch 41 and a battery 49. These components are mounted on a printed circuit-board, not shown, or provided in a housing, not shown. In terms of the hardware, the QR code reader 20 is configured in the similar manner as a general purpose QR code reader.

As mentioned above, the optical system includes the illumination source 21, the light-receiving sensor 23 and the imaging lens 27. The illumination source 21 functions as an illumination source that can emit illumination light Lf. For example, the illumination source 21 includes a red LED, a diffuser lens provided on the emission side of the LED, and a condenser lens. In the second embodiment, the illumination source 21 is provided on lateral sides so as to sandwich the light-receiving sensor 21, and configured so that the light Lf can be emitted toward the label P through a reading port of a case, not shown. The QR code Q explained in the first embodiment is printed on the label P.

The light-receiving sensor 23 is configured so that reflected light Lr which is the reflection of the light that has been radiated to the label P or the QR code Q. For example, an area sensor may correspond to the light-receiving sensor 23. In such an area sensor, light-receiving elements, or solid-state image sensing elements, such as C-MOS and CCD, are two-dimensionally arranged. The light-receiving sensor 23 is mounted on a printed circuit board, not shown, so that the incident light that enters through the imaging lens 27 can be received by a light-receiving surface 23a.

The imaging lens 27 functions as an imaging optical system which is able to collect the incident light entering from outside through the reading port and make an image on the light-receiving surface 23a of the sensor 23. For example, the imaging lens includes a lens tube and a plurality of condenser lenses accommodated in the lens tube.

The configuration of the microcomputer system is described. The microcomputer system includes an amplifier circuit 31, A/D converter circuit 33, memory 35, address generation circuit 36, sync signal generation circuit 38, control circuit 40, operation switch 42, LED 43, buzzer 44, LCD 46 and communication interface 48. As implied by the name, the microcomputer system is configured centering on the control circuit 40 and the memory 35 which can behave as a microcomputer.

An image signal outputted from the light-receiving sensor 23 of the optical system is amplified with predetermined gain by being inputted from the amplifier circuit 31, and then inputted to the A/D converter circuit 33 for conversion into a digital signal from an analogue signal. The digitized image signal, i.e. image data, is inputted to the memory 35 for storage in an image data storage region. The sync signal generation circuit 38 is configured so as to be able to generate a sync signal for the light-receiving sensor 23 and the address generation circuit 36. The address generation circuit 36 is configured so as to be able to generate a storage address for the image data to be stored in the memory 35, on the basis of the sync signal supplied from the sync signal generation circuit 38.

The memory 35 is a semiconductor memory device which corresponds, for example, to an RAM (DRAM, SRAM, etc.) and ROM (EPROM, EEPROM, etc.). In the memory 35, the RAM is configured so that operation regions, for example, can be provided other than the image data storage region mentioned above. These operation regions are used for various processes, such as an arithmetic operation and a logic operation, which are performed by the control circuit 40. Programs are preset in the ROM. The programs include, for example, a given program that can execute decoding processes, which will be described later, and a system program that can control various pieces of hardware, such as the illumination source 21 and the light-receiving sensor 23.

The control circuit 40 is a microcomputer which is able to totally control the QR code reader 20, and includes a CPU, a system bus and an input/output interface. The control circuit 40 may constitute an information processor together with the memory 35, and has a function of processing information.

The control circuit 40 is configured so that it can be connected to various input/output devices through the incorporated input/output interface. For example, the control circuit 40 is connected, in the second embodiment, to the power switch 41, operation switch 42, LED 43, buzzer 44, LCD 46 and communication interface 48.

Thus, for example, the power switch 41 and the operation switch 42 can be monitored and controlled. On/off control can be performed for the LED 43 that functions as an indicator, and also for the sound of the buzzer 44 that can generate beep and alarm sounds. Further, screen control can be performed for the LCD 46 which is able to display the contents of the code in the read-out QR code Q. Also, communication control, for example, can be performed for the communication interface 48 which is able to perform serial communication with external units. The external units connected to the communication interface 48 include a host computer HST which corresponds to a host system of the QR code reader 20.

The power system includes the power switch 41 and the battery 49. The battery 49 supplies drive voltage to the individual devices and circuits. In response to the on/off control of the power switch 41, which is under the control of the control circuit 40, the supply of the drive voltage from the battery 49 is controlled. The battery 49 is a secondary battery which is able to generate a predetermined DC voltage. The battery 49 corresponds, for example, to a lithium ion battery. The QR code reader 20 may be configured so that power can be supplied from an external unit, such as the host computer HST, connected through the communication interface 48, rather than from the battery 49. In this case, the battery 49 can be omitted.

In the QR code reader 20 configured in this way, when the power switch 41 is turned on, for example, predetermined self-diagnostic processes and the like can be normally completed to bring the reader 20 into a state of enabling reading of the QR code Q. Then, an input from the operation switch 42 (e.g., trigger switch) is received, instructing emission of the illumination light Lf. Thus, when the user turns on the trigger switch, the control circuit 40 outputs an emission signal to the illumination sources 21 referring to the sync signal. The illumination sources 21 that have received the emission signal permit the LED to emit light for radiation of the illumination light Lf.

The illumination light Lf radiated to the QR code Q is reflected. The reflected light Lr then enters the imaging lens 27 through the reading port, so that an image of the QR code Q is formed on the surface 23a of the light-receiving sensor 23. Thus, the image of the QR code Q exposes the sensor 23. Accordingly, the image data of the QR code Q that has been subjected to image processing by the microcomputer system described above is then subjected to the decoding processes, which will be described below, through the image data storage region of the memory 35.

Figure 6:
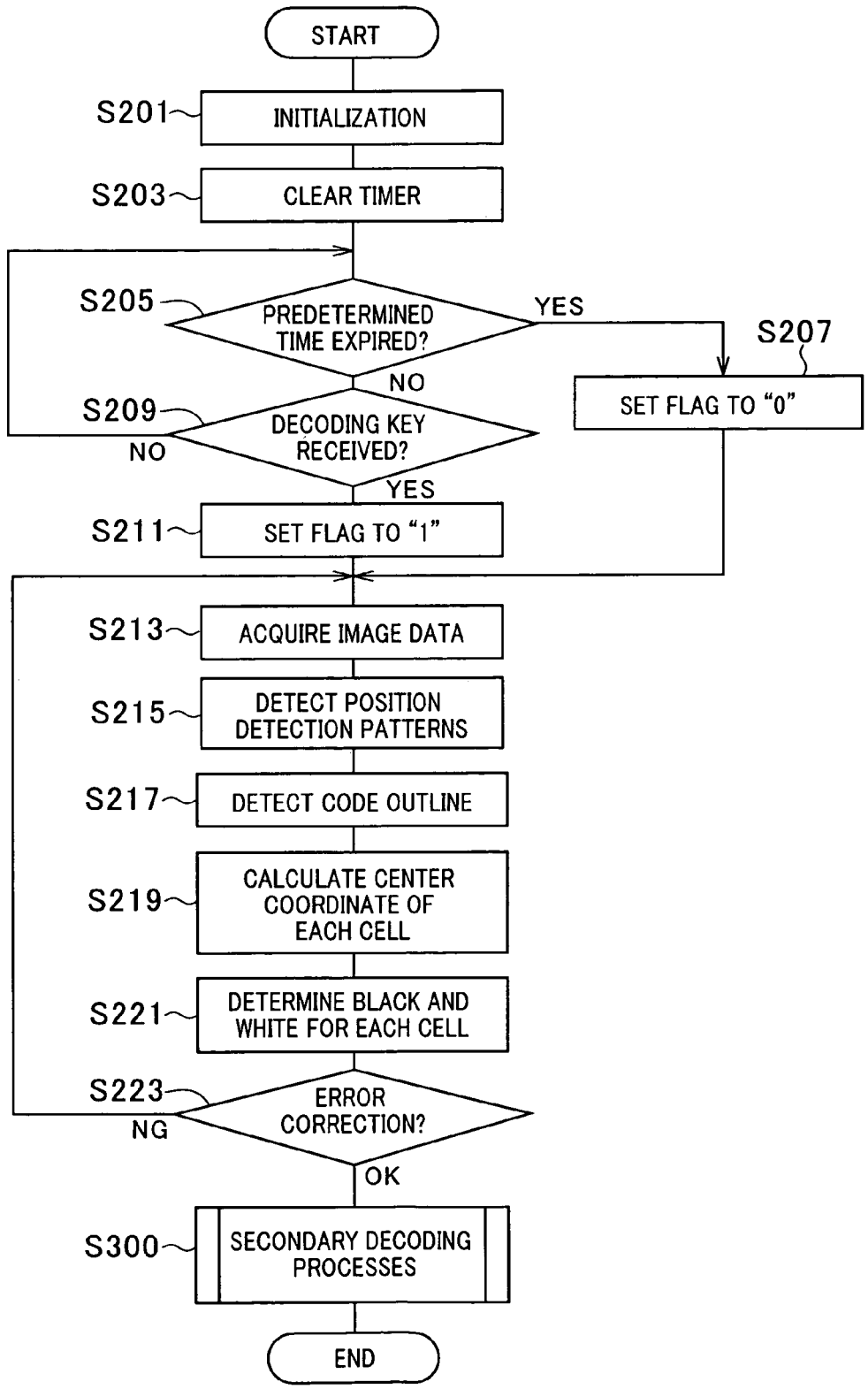
FIG. 6 is a flow diagram illustrating a flow of primary decoding processes executed by a control circuit of a QR code reader, according to the second embodiment.
Figure 7:
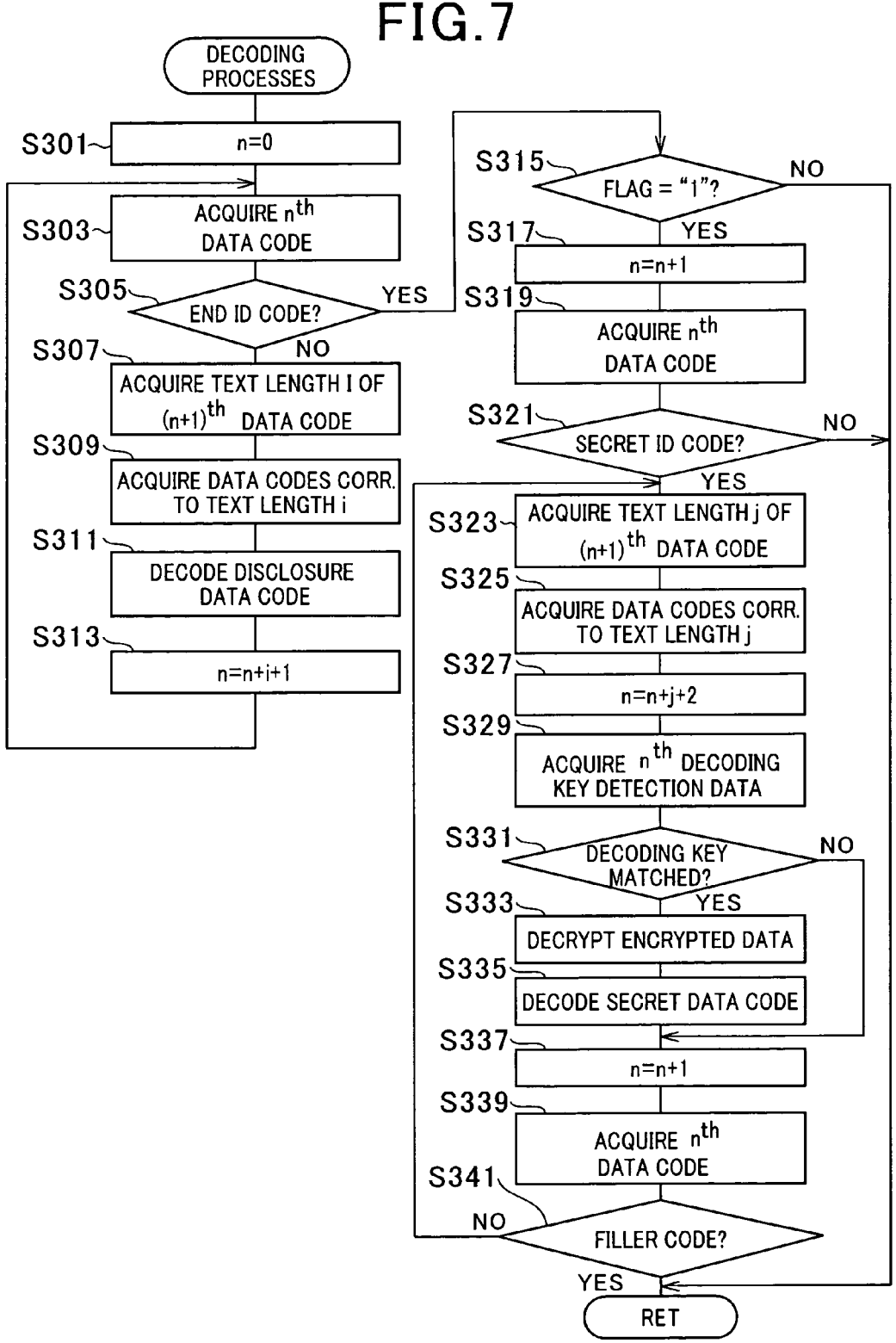
FIG. 7 is a flow diagram illustrating a flow of secondary decoding processes of FIG. 6.

Referring to FIGS. 4, 6 and 7, hereinafter are described the decoding processes. FIG. 6 is a flow diagram illustrating a flow of primary decoding processes. FIG. 7 is a flow diagram illustrating a flow of secondary decoding processes of FIG. 6. FIG. 4 is an explanatory view illustrating an example of a configuration of the QR code of type 1.

As shown in FIG. 6, the primary decoding processes are started by the control circuit 40 and the memory 35 which are activated when the QR code reader 20 is switched on. First, at step S201, initialization is performed. In this process, the operation region and the storage region of image data in the memory 35 are cleared, or predetermined flags or counters are cleared. The QR code reader 20 described here is connected to the host computer HST, from which decoding key data are acquired as setting data.

At step S203, the count value of a timer is cleared. The timer whose count value is cleared at this step S203 is to measure passage of predetermined time at the subsequent step S205.

At step S205, the timer mentioned above determines whether or not the predetermined time has expired. Specifically, it is required, at the subsequent step S209, to determine whether or not the setting data transmitted from the host computer HST include the decoding key data. In this regard, the timer determines, at step S205, for example, whether or not predetermined time of five seconds has expired. If the data concerning encryption is not transmitted from the host computer HST by the expiration of the time, control proceeds to step S207 upon expiration of the predetermined time ("Yes" at step S205).

If the predetermined time has not expired ("No" at step S205), it is determined, at the subsequent step S209, whether or not decoding keys have been received. When the decoding keys are determined as having been received ("Yes" at step S209), control proceeds to the subsequent step S211. When the decoding keys are determined as not having been received ("No" at step S209), control returns to step S205 described above so that the expiration of the predetermined time can again be determined.

Then, when the predetermined time is determined, at step S205, as having expired ("Yes" at step S205), a predetermined flag is set to "0" at step S207. This flag indicates whether or not the secret data codes of the QR code Q are to be decoded with the decoding keys. If the flag is set to "0", it means that the codes are not to be decoded with the decoding keys. If the flag is set to "1", it means that the codes are to be decoded with the decoding keys. Thus, if it is determined, at step S209, that the decoding keys have been received ("Yes" at step S209), this flag is set to "1" at the subsequent step S211.

After setting the predetermined flag to "1" at step S211, the image data is acquired at the subsequent step S213. In other words, the image data stored in the image data storage region of the memory 35 are read out. Thus, a code image of the QR code Q as illustrated in FIG. 4, for example, can be acquired.

At the subsequent step S215, position detection patterns are detected. Specifically, as shown in FIG. 4, the QR code Q is provided with the position detection patterns at its three corners. By detecting these patterns, the outline of the QR code Q can be detected at the subsequent step S217.

At step S219, the center coordinate of each cell is calculated, whereby black and white of each cell can be determined at the subsequent step S221. This enables recognition of the form information shown in FIG. 4 (shaded areas in FIG. 4) or the data blocks. Thus, if any deficient data blocks are present, it is determined, at the subsequent step S223, whether or not the blocks can be subjected to error correction.

When it is determined, at step S223, the error correction can be performed ("OK" at step S223), the error correction is performed. Control then proceeds to step S300 where the secondary decoding processes are performed. On the other hand, when it is determined, at step S223, the error correction cannot be performed ("NG" at step S223), control returns to step S213 to again acquire the image data and perform steps S215 to S221.

Details of step S300 are illustrated in FIG. 7. Hereinafter, referring to FIG. 7, secondary decoding processes are described. As shown in FIG. 7, in the secondary decoding processes, "0" (zero) is set first to a counter n at step S301. In the present secondary decoding processes, the counter n functions as a variable for indicating an order of the data codes constituting the QR code Q.

At step S303, an $n^{th}$ data code indicated by the counter n is acquired. At the subsequent step S305, it is determined whether or not the $n^{th}$ data code acquired at step S303 is the end ID code. If the data code is determined as being the end ID code ("Yes" at step S305), the read-out QR code may not include normal data code, any more, to be located before the end ID code. Thus, control proceeds to step S315.

Meanwhile, if the data code cannot be determined as being the end ID code ("No" at step S305), it means that the QR code still have normal data codes after this $n^{th}$ data code in question. Thus, control proceeds to step S307 where the subsequent data code, i.e. an $(n+1)^{th}$ data code, or the number of codes (text length) i, is acquired. As described in the first embodiment referring to FIG. 3D, this is based on the matter that the text length is stored in a position corresponding to the second one of the data codes. The details are described in "8.4 Encoding of Data" of JIS basic specification (JIS X 0510: 2004).

After acquiring the text length i at step S307, the data codes corresponding to the text length i are acquired at the subsequent step S309. Then, at step S311, the data codes, that is, the disclosure data codes (data codes encoded as codewords representing data to be disclosed) are decoded.

After completing the decoding process at step S311, control proceeds to step S313 where "n+i+1" is set to the counter n so that the counter n can indicate the subsequent data code. Then, control returns to step S303 to acquire the $n^{th}$ data code.

In this way, at steps S303 to S313, normal data codes located before the end ID code and should originally be decoded are acquired and decoded (first data codes or disclosure data codes). Thus, the control circuit 40 and the like executing these steps may correspond to the "first decoding means" recited in the claims.

At step S315, it is determined whether or not the predetermined flag mentioned above is set to "1", or whether or not the secret data codes of the QR code Q are to be decoded by the decoding keys. When the flag is not set to "1" ("No" at step S315), there is no need of performing decoding using the decoding keys. Thus, the present secondary decoding processes are ended to end step S300 of FIG. 6.

When the predetermined flag is set to "1" ("Yes" at step S315), decoding with the decoding keys is required, and control proceeds to the subsequent step S317 where "n+1" is set to the counter n. Then, at step S319, the $n^{th}$ data code indicated by the counter n is acquired.

At the subsequent step S321, it is determined whether or not the $n^{th}$ data code acquired at step S319 is the secret ID code. Thus, the control circuit 40 and the like executing step S321 may correspond to the "data code determining means" and the "secret ID code determining means" recited in the claims.

When the data code is determined as being the secret ID code ("Yes" at step S321), it means that secret data codes are present after the secret ID code. Then, control proceeds to step S323 where the subsequent data code, i.e. the $(n+1)^{th}$ data code, or the number of codes (text length) j, is acquired. Similar to step S309, this is based on the matter that the text length is stored at a position corresponding to the second one of the data codes.

When it is determined, at step S321, that the secret ID code is present, the presence of the secret ID code in the QR code Q may be ensured to be informed to the host computer HST, for example. Thus, the host computer can grasp the fact that the data codes subsequent to the end ID code are secret data codes. It may happen that data codes which are neither filler codes nor secret data codes (e.g., garbled filler codes which are no longer filler codes) may be located in the code region (vacant portion of the code region) after the end ID code, where only the filler codes should originally be located. In such a case, the information of the data codes as being the secret data codes will not be outputted to the host computer HST. Therefore, the occurrences of malfunction can be prevented, which malfunction would have otherwise been caused by decoding data codes other than the secret data codes.

If the data code cannot be determined as being the secret ID code ("No" at step S321), it means that no secret data codes are present, any more, after this $n^{th}$ data code in question in the QR code Q. Then, the present secondary decoding processes are ended, that is, step S300 of in FIG. 3 is ended to end the primary decoding processes.

After acquiring the text length j at step S323, control proceeds to step S325 where data codes corresponding to the text length j are acquired. Then, at step S327, "n+j+2" is set to the counter n so that the counter n can indicate the subsequent data code, i.e. a secret data code. After that, at step S329, the $n^{th}$ decoding key detection data (key identifying information) is acquired.

Then, at step S331, it is determined whether or not the decoding key received from the host computer HST at the previous step S209 matches as a key for decrypting the encrypted data of the $n^{th}$ secret data code, on the basis of the decoding key detection data acquired at step S329. When the decoding key is determined as being matched, at step S331 ("Yes" at step S331), the encrypted data is decrypted at the subsequent step S333.

The cryptography used here is the known composite visual cryptography (composite visual secret distribution process) mentioned in the first embodiment. Thus, even when the encrypted data of the secret data code is encrypted using the composite visual cryptography, the data can be decoded and restored to the original plain text. The control circuit 40 and the like executing step S333 may correspond go the "decoding means" recited in the claims.

When it is determined, at step S331, that the decoding key is not matched ("No" at step S331), the $n^{th}$ secret data code in question is not encrypted, and control proceeds to step S337 where "n+1" is set to the counter n to acquire the subsequent secret data code. Thus, in the case where the decoding key possessed by the QR code reader 20 is not the decoding key for decrypting the $n^{th}$ secret data code in question, the $n^{th}$ secret data code is neither decrypted nor decoded. Thus, unnecessary decoding processes are suppressed from being performed. The control circuit 40 and the like executing step S331 may correspond to the "key matching determining means" recited in the claims.

At step S335, the secret data code is decoded. Specifically, since the encrypted data has been decrypted at the previous step S333, the secret data code is decoded, at step S335, based on the decrypted data.

After the decoding process of step S335 is over, control proceeds to step S337 where "n+1" is set to the counter n so that the counter n can indicate the subsequent data code. Then, at the subsequent step S339, the $n^{th}$ data code is acquired.

At step S341, it is determined whether or not the $n^{th}$ data code acquired at step S339 is a filler code. If the $n^{th}$ data code is a filler code ("Yes" at step S341), it means that the QR code Q does not contain secret data codes any more. Thus, the present secondary decoding processes are ended, or step S300 of FIG. 6 is ended to thereby end the primary decoding processes.

If the $n^{th}$ data code is determined, at step S341, as not being a filler code ("No" at step S341), it means that the $n^{th}$ data code is a secret data code. In this case, control returns to step S323 where the $(n+1)^{th}$ data code, or the number of codes (text length) j, is again acquired to perform the processes described above.

In this way, at steps S319 and S323 to S335, the data codes which are located after the end ID code and should not originally be decoded (second data codes, or secret data codes), are acquired and decoded. Thus, the control circuit 40 and the like executing these steps may correspond to the "second decoding means" recited in the claims.

As described above, in the QR code reader 20 according to the second embodiment, even when secret data codes (second data codes) are located in a code region after the end ID code (vacant portion of the code region), in which only filler codes should originally be located, the secret data codes can be decoded. Accordingly, decoding can be performed for the data codes which are present in the vacant portion of the code region, in which codewords should be located. Thus, the QR code Q printed by the QR code printer 10 according to the first embodiment can be decoded by the QR code reader 20 according to the second embodiment.

In the decoding processes described above, it has been so configured that the $n^{th}$ decoding key detection data is acquired at step S329. Alternatively, as explained in the first embodiment referring to FIG. 3E, if a decoding key per se is imparted to a secret data code, the $n^{th}$ decoding key may be acquired at step S329. Thus, even when the QR code reader 20 does not have a decoding key (key that enables decoding) for the secret data code, the secret data code can be decoded and restored to the original plain text. In this case, the control circuit 40 and the like executing the process of "acquiring the $n^{th}$ decoding key" may correspond to the "key separating means" recited in the claims.

Even when each secret data code is encrypted with a different encrypting key, if each secret data code is imparted with a decoding key, the $n^{th}$ decoding key may be acquired at step S329. Thus, even when the QR code reader 20 does not have a decoding key for the secret data code, the secret data code can be decoded and restored to the original plain text.

Further, in the decoding processes described above, the $n^{th}$ decoding key detection data has been adapted to be acquired at step S329. There may be a case, for example, where the "start position" as the position information is added to the secret data code as described referring to FIG. 3D in the first embodiment. In such a case, the "start position" may be separated from the secret data code, at step S329, and the secret data having the decoded secret data code may be located in the data record so as to have a positional relationship before encoding, on the basis of the separated "start position". Thus, even when data before being encoded as codewords, are disorderly located in a positional relationship in the data record, the decoded data can be located in the data record so as to have the positional relationship before encoding, on the basis of the position information.

In this case, the control circuit 40 and the like executing the process of "separating the 'start position' from the secret data code" may correspond to the "position information separating means" recited in the claims. Also, the control circuit 40 and the like executing the process of "locating the secret data having the decoded secret data code in the data record so as to have the positional relationship before encoding, on the basis of the separated 'start position'" may correspond to the "data locating means" recited in the claims.

Third Embodiment

Referring now to FIG. 8, and FIGS. 9A to 9F, hereinafter is described a third embodiment of the present invention.

Figure 8:
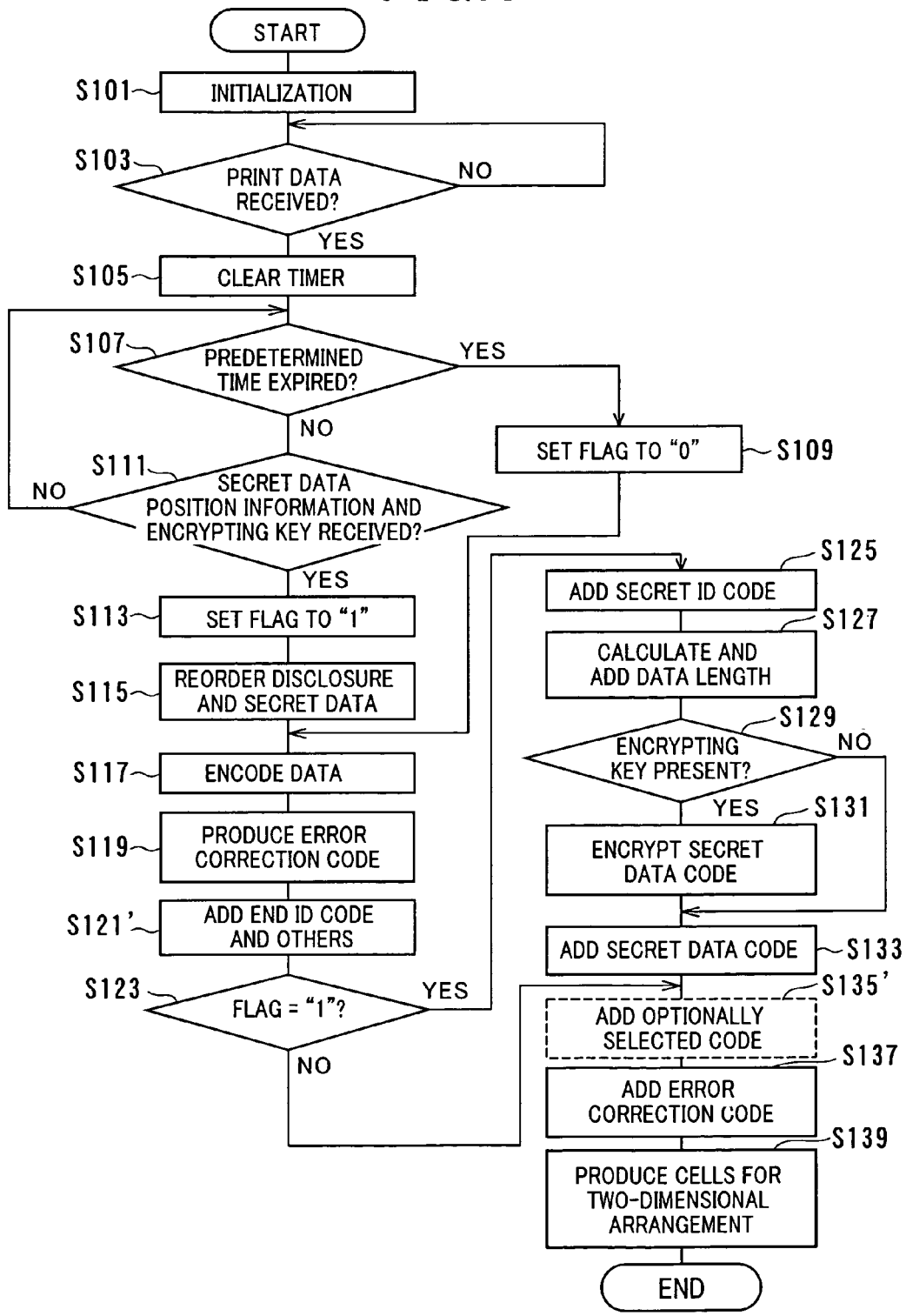
FIG. 8 is a flow diagram illustrating a flow of code producing processes executed by a QR code printer, according to a third embodiment of the present invention.
Figure 9:
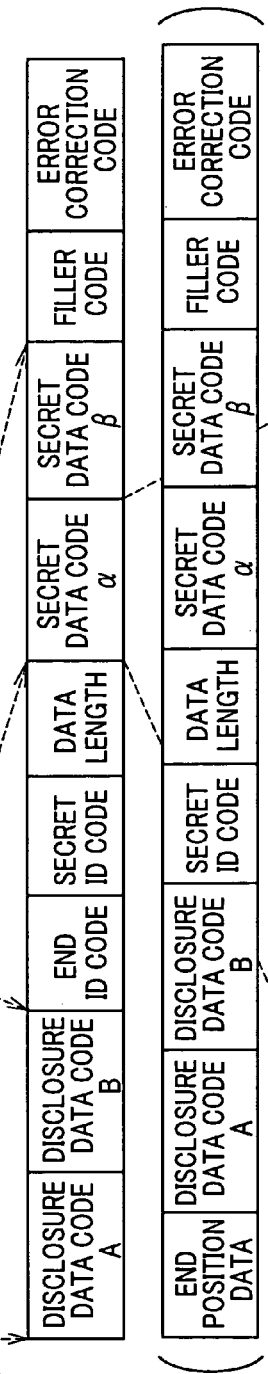
FIGS. 9A to 9F are explanatory views illustrating examples of formats for data and codes which are subjected to information processing in the code producing processes illustrated in FIG. 8.

In the third embodiment, another QR code is produced using the QR code printer 10 according to the third embodiment. FIG. 8 is a flow diagram illustrating a flow of code producing processes executed by a QR code printer, according to a third embodiment of the present invention. FIG. 9A is an example of data record of print data, FIG. 9B is an example of reordered data record, FIG. 9C is an example after addition of codes, FIG. 9D is an example of a configuration of the secret code illustrated in FIG. 9C, FIG. 9E is another example of a configuration of the secret code illustrated in FIG. 9C, and FIG. 9F is still another example of a configuration of the secret code illustrated in FIG. 9C.

The QR code described here uses a format, as shown in FIG. 9C, in which optionally selected codes (e.g., "00000000", "11111111", etc.) are used for filling an empty region, instead of using filler codes ("11101100").

As shown in FIG. 8, the code producing processes are started by the MPU 11 and the memory 12 which are activated by turning on the QR code printer 10. When initialization is performed at step S101, print data is received at the subsequent step S103. Secret data are received through steps S107 and S111, and then disclosure data and secret data are reordered, at step S115. Then, at step S117, individual data including the disclosure and secret data are encoded, which is followed by step S119 where an error correction code is produced. At step S121, an end ID code is located after disclosure data codes.

Alternative to locating the end ID code after the disclosure data codes, codes can be arranged, for example, as shown in the bracketed format of FIG. 9C. Specifically, data length of every disclosure data code is calculated to obtain a "end position of a code string of disclosure data codes" (hereinafter referred to just as a "end position"). Such end position data for identifying the end position may be located at the head of the disclosure data codes.

If secret data are contained in the print data ("Yes" at step S123), a secret ID code and the like are additionally located at steps 125 to S133 after the end position. If no secret data are contained after the end position ("No" at step S123), "00000000" and "11111111", for example, are added, at step S135', as the optionally selected codes mentioned above.

Specifically, in the case where an empty space (vacant portion of the code region) still remains after filling secret data codes in a region ranging from after the end position to an error correction code, the optionally selected codes (e.g., "00000000" and "11111111") are filled. Thus, for example, in the case where all the range of the memory constituting such a data format is filled in advance with such optionally selected codes in the initialization of step S101, the process of step S135' may be omitted (the frame line of step S135' in FIG. 8 is indicated by a broken line).

By additionally locating an error correction code at step S137, the data codes in the format shown in FIG. 9C is produced. Then, at the subsequent step S139, cells are produced based on these data codes and arranged in the data blocks explained referring to FIG. 4. The arrangement is made in the same manner as the case of the QR code explained referring to FIGS. 2 to 4, except that the optionally selected codes are arranged in the range where filler codes should originally be arranged.

As described above, in the QR code Q produced by the code producing processes which is executed by the MPU 11 of the QR code printer 10 according to the third embodiment, the secret data codes are located after the end position. Thus, the secret data codes located after the end position are excluded from reading in a general purpose reader. Accordingly, when a two-dimensional code containing such secret data codes is read by a general purpose reader, the presence of the data to be kept in secret cannot be recognized by the reader, owing to the secret data codes. In other words, it is ensured that the user of the general purpose reader is prevented from noticing the presence of the secret data.

In this way, if the secret data codes are contained in the QR code Q, the data codes corresponding to the secret data codes are not imaged on the display of a general purpose reader. Thus, the presence of the secret data would not be noticed by the user, and the user may not have mistrust for the reading or may not be inadvertently motivated to make an attempt of decrypting the QR code Q. Even when the data codes corresponding to the secret data codes are control data, for example, such codes are not displayed and thus the screen view may not be distorted.

The third embodiment has been described exemplifying a case where the QR code Q is printed on the label P by the QR code printer 10. The present invention is not limited to this exemplification, but the QR code Q may only be visually expressed.

For example, it may be so configured that the code producing processes illustrated in FIG. 8 are executed by the computer unit 2 to indicate the QR code Q on the display 3. In this case, the following technical idea may constitute:

That is, the technical idea of "A program for producing two-dimensional codes, the program being for functioning a computer as a two-dimensional code producing device in which, when the total number of disclosure data codes, which are encoded as codewords representing the disclosure data, is less than a value corresponding to a capacity that can be accommodated in the code region for locating the codewords, an end ID code indicating an end of a code string constituted of the disclosure data codes that are located in the code region, is located at an end of the code string, or end ID information which is able to identify an end position of the code string constituted of the disclosure data codes is located at a predetermined position of the code string, characterized in that: secret data codes encoded as codewords representing data to be kept in secret, are located after the end ID code, or after the end position identified by the end ID information".

Thus, with the program for producing two-dimensional codes, the computer functioning as a two-dimensional code producing device may provide the advantages similar to the MPU 11 and the like of the QR code printer 10 described above.

The third embodiment has been described exemplifying a configuration in which the computer 1 is connected to the QR code printer 10 and the print data is transmitted from the computer 1. However, any digital camera, mobile phone or hand-held computer and handy terminal, for example, having such a function may be connected to the QR code printer 10 to obtain the same advantages, if only these devices are information processors capable of outputting character data, such as alphameric characters, Japanese characters (Kanji) and symbols.

Fourth Embodiment

Figure 10:
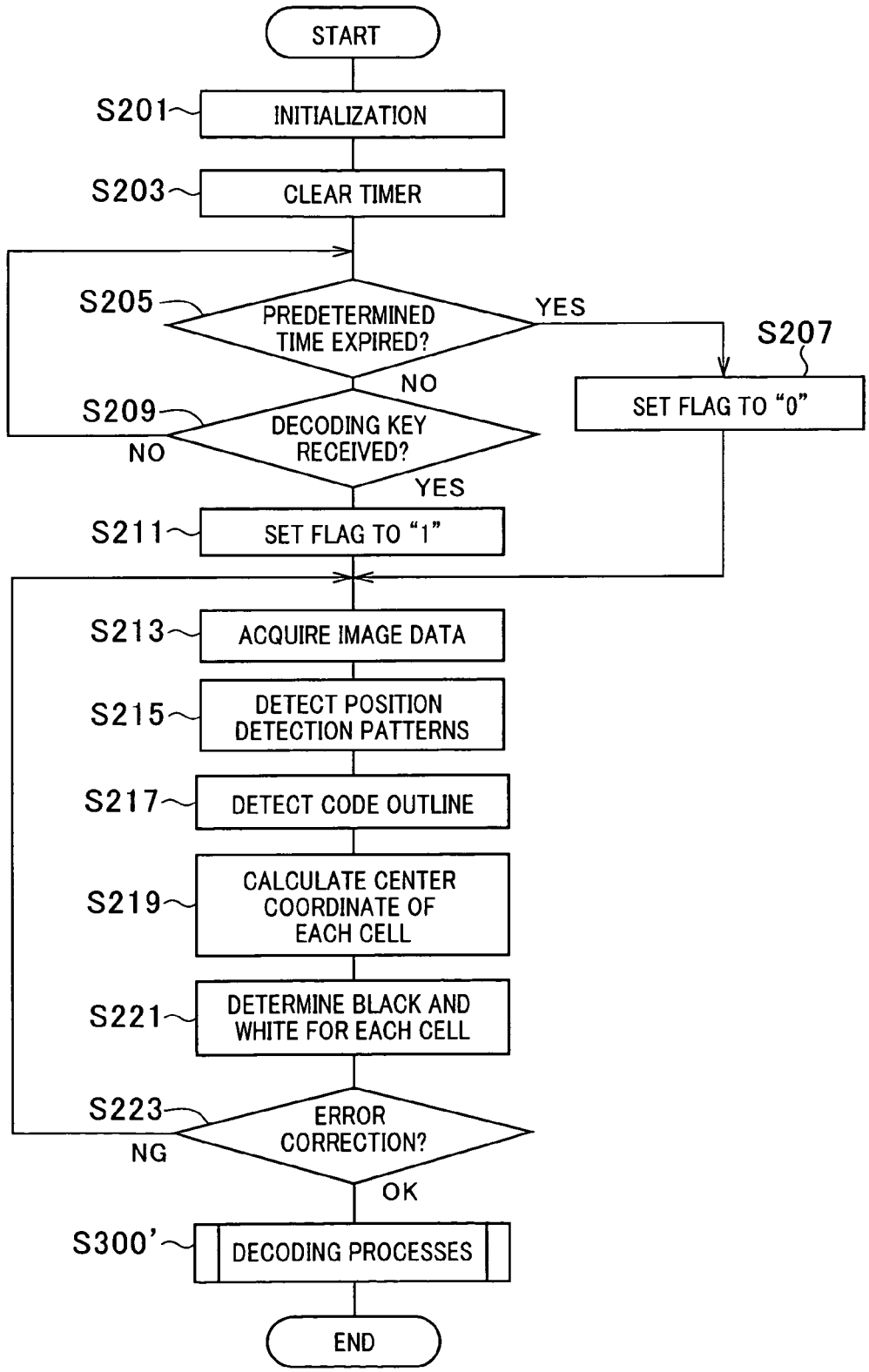
FIG. 10 is a flow diagram illustrating a flow of primary decoding processes executed by a control circuit of a QR code printer, according to a fourth embodiment of the present invention.
Figure 11:
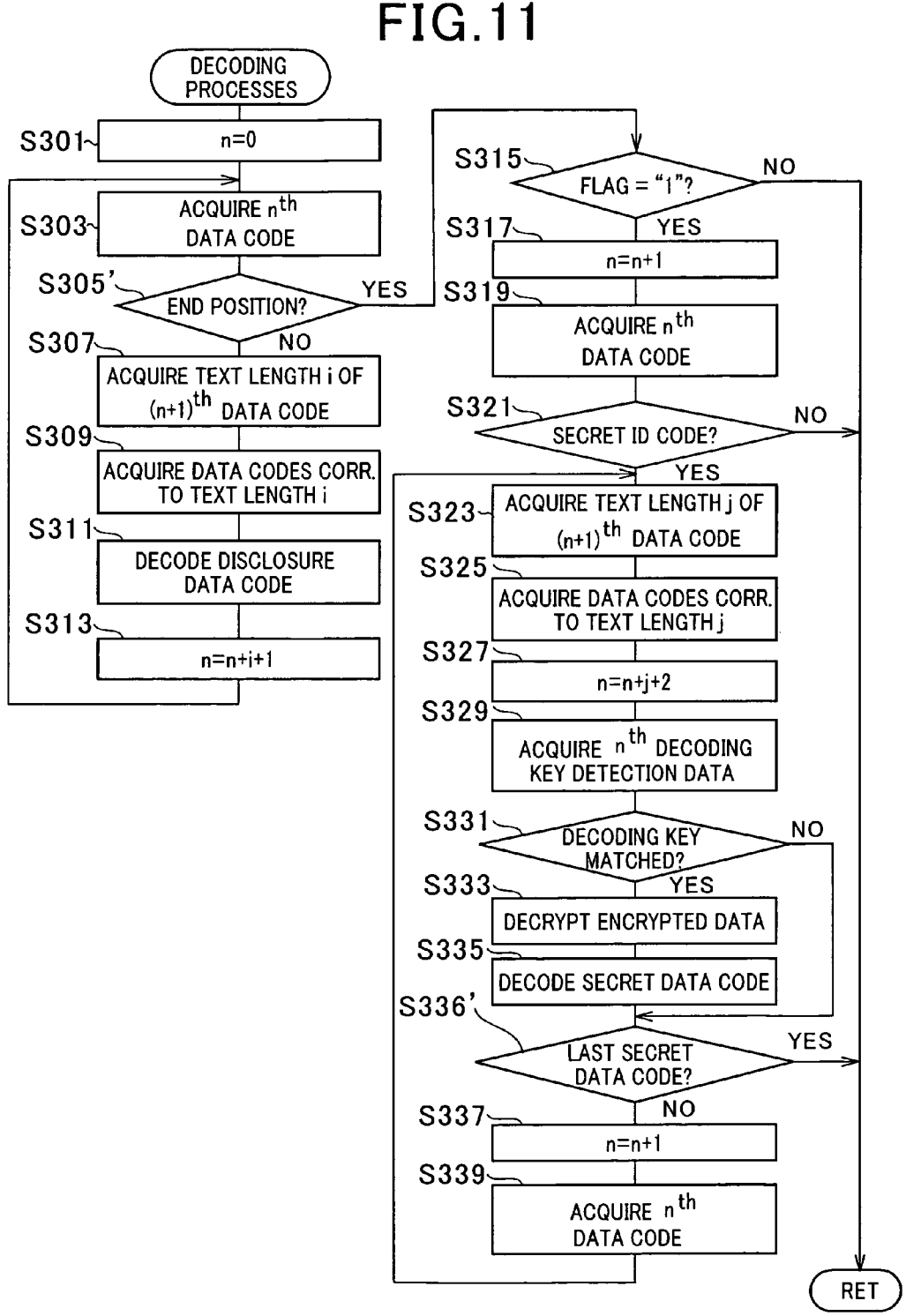
FIG. 11 is a flow diagram illustrating a flow of secondary decoding processes of FIG. 10.

Referring now to FIGS. 10 and 11, hereinafter is described a fourth embodiment of the present invention.

In the decoding processes of the fourth embodiment, another QR code is decoded using the QR code reader 20. The "another QR code" described here uses a format in which optionally selected codes (e.g., "00000000", "11111111", etc.) are used for filling an empty region. That is, the QR code here is the QR code printed by the QR code printer 10 of the third embodiment.

FIG. 10 is a flow diagram illustrating primary decoding processes according to the fourth embodiment. As shown in the figure, the primary decoding processes are started by the control circuit 40 and the memory 35 activated by turning on the power of the QR code reader 20. Initialization is performed first at step S201. Then, after expiration of a predetermined time at step S205 ("Yes" at step S205), or after receiving decoding keys at step S209 ("Yes" at step S209), image data are acquired at step S213. The image of the QR code Q is then recognized at steps S215, S217, S219 and S221. At step S223, it is determined whether or not error correction is possible. If the correction is determined as being possible ("OK" at step S223), the error correction is performed. Control then proceeds to step S300' where secondary decoding processes (FIG. 11) are carried out.

As shown in FIG. 11, in the secondary decoding processes of step S300', when an end position is found at steps S301 to S313 ("Yes" at step S305'), an $n^{th}$ data code indicated by the counter n is acquired at steps S315, S317 and S319. Then, it is determined, at step S321, whether or not the $n^{th}$ data code is a secret ID code. It should be appreciated that the term "end position" refers to an end position of a code string structured by disclosure data codes, which can be identified by an end ID code or end position data. When the $n^{th}$ data code is determined as being a secret ID code ("Yes" at step S321), matching of the decoding key is checked, at steps S323 to S331, to decrypt the encrypted data with the decoding key at step S333. Then, at step S335, the secret data code is decoded.

When it is determined, at step S321, that a secret ID code is located, it may be so configure, for example, that the host computer HST is notified of the fact that the QR code Q has a secret ID code. This enables the host computer HST to grasp the fact that the data codes after the end ID code are secret data codes. It may happen that data codes which are neither filler codes nor secret data codes (e.g., garbled filler codes which are no longer filler codes) may be located in the code region (vacant portion of the code region) after the end ID code, where only the filler codes should originally be located. In such a case, the information of the data codes as being the secret data codes will not be outputted to the host computer HST. Therefore, the occurrences of malfunction can be prevented, which malfunction would have otherwise been caused by decoding data codes other than the secret data codes.

At step S336', it is determined whether or not the decoded secret data code is the last secret data code. Specifically, as shown in FIG. 9C, for example, a data length of the subsequent secret data codes is stored next to the secret ID code. Thus, based on the data length, the secret data code can be determined as to whether or not it is the last secret data code. In addition, as described above, optionally selected codes (e.g., "00000000", "11111111", etc.) are filled in after the last secret data code, i.e. in the empty region (vacant portion of the code region). Thus, based on the presence of such optionally selected codes, it is determined whether or not the secret data code in question corresponds to the last secret data code.

When the secret data code in question is not determined as being the last secret data code at step S336' ("No" at step S336'), "n+1" is set at the counter n, at step S337, so that the counter n can indicate the subsequent data code. Then, at step S339, the $n^{th}$ data code is acquired, and then, similar to the above description, matching of a decoding key is checked at steps S323 to S331.

On the other hand, when the secret data code in question is determined, at step S336', as being the last secret data code ("Yes" at step S336'), it means that the QR code Q do not contain secret data codes any more. Thus, the present secondary decoding processes are ended, or the step S300' of FIG. 10 is ended.

It should be appreciated that, at steps S303 to S313, normal data codes which are located before the end position and should originally be decoded (first data codes, or disclosure data codes), are acquired and decoded. Thus, the control circuit 40 and the like executing these steps may correspond to the "first decoding means" recited in the claims.

Also, at step S321, the $n^{th}$ data code acquired at step S319 is subjected to the process for determining whether or not it is the secret ID code. Thus, the control circuit 40 and the like executing step S321 may correspond to the "data code determining means" or the "secret ID code determining means" recited in the claims. Further, the control circuit 40 and the like executing steps S331 and S333 may correspond to the "key matching determining means" or the "decoding means" recited in the claims.

In addition steps S319 and S323 to S335 perform processes of acquiring and decoding data codes which are located after the end position and should not originally be decoded (second data codes, or secret data codes). Thus, the control circuit and the like executing these steps may correspond to the "second decoding means" recited in the claims.

The QR code reader 20 according to the fourth embodiment described above is able to decode secret data codes (second data codes) even when the secret data codes are located in a code region after the end position (vacant portion of the code region), where data codes should not originally be located. Thus, the data codes can be decoded, which are present in the vacant portion of the code region where codewords are to be located.

In this way, the QR code Q printed by the QR code printer 10 of the third embodiment can be decoded by the QR code reader 20 of the fourth embodiment.

In the decoding processes described above, it has been so configured that the $n^{th}$ decoding key detection data is acquired at step S329. Alternatively, as explained in the first embodiment referring to FIG. 3E, if a decoding key per se is imparted to a secret data code, the $n^{th}$ decoding key may be acquired at step S329 in the fourth embodiment as well. Thus, even when the QR code reader 20 does not have a decoding key (key that enables decoding) for the secret data code, the secret data code can be decoded and restored to the original plain text. In this case, the control circuit 40 and the like executing the process of "acquiring the $n^{th}$ decoding key" may correspond to the "key separating means" recited in the claims.

Even when each secret data code is encrypted with a different encrypting key, if each secret data code is imparted with a decoding key, the $n^{th}$ decoding key may be acquired at step S329. Thus, even when the QR code reader 20 does not have a decoding key for the secret data code, the secret data code can be decoded and restored to the original plain text.

Further, in the decoding processes described above, the $n^{th}$ decoding key detection data have been adapted to be acquired at step S329. There may be a case, for example, where the "start position" as the position information is added to the secret data code as described referring to FIG. 3D in the first embodiment. In such a case, the "start position" may be separated from the secret data code, at step S329, and the secret data having the decoded secret data code may be located in the data record so as to have the positional relationship before encoding, on the basis of the separated "start position". Thus, even when data before being encoded as codewords, are disorderly located in a positional relationship in the data record, the decoded data can be located in the data record so as to have the positional relationship before encoding, on the basis of the position information.

In this case, the control circuit 40 and the like executing the process of "separating the 'start position' from the secret data code" may correspond to the "position information separating means" recited in the claims. Also, the control circuit 40 and the like executing the process of "locating the secret data having the decoded secret data code in the data record so as to have a positional relationship before encoding, on the basis of the separated "start position" may correspond to the "data locating means" recited in the claims.

Fifth Embodiment

Referring now to FIGS. 12 and 13 as well as FIGS. to 14A to 14E, hereinafter is described a fifth embodiment of the present invention.

According to the fifth embodiment, another QR code is produced using the QR code printer 10. FIG. 12 is a flow diagram illustrating a flow of code producing processes executed by a QR code printer, according to a fifth embodiment of the present invention. FIG. 13 is a flow diagram illustrating the particular processes of FIG. 12. FIG. 14A is an example of a code produced by the code producing processes of the third embodiment (corresponding to the example of FIG. 9C), FIG. 14B is an example of a secret data code after being diffused, FIG. 14C is an example of a secret data code whose bits are reordered or bit values are converted, FIG. 14D is an example of a secret data code illustrated in FIG. 14C, FIG. 14E is an example of a secret data code produced through the code producing processes of the third embodiment (corresponding to the example of 9D), as a comparison with the secret data code of FIG. 14D.

The QR code described here uses a format, as shown in FIG. 14B, in which secret data codes α and β are applied with predetermined processes and filled in a predetermined vacant region.

As shown in FIG. 12, the code producing processes are started by the MPU 11 and the memory 12 which are activated by turning on the QR code printer 10. When initialization is performed at step S101, print data is received at the subsequent step S103. Secret data are received through steps S107 and S111, and then control proceeds to step S117. At step S117, individual data including the disclosure and secret data are encoded, which is followed by step S121' where an end ID code (including an end position of a code string structuring disclosure data codes), for example, is added.

If secret data are contained in the print data ("Yes" at step S123), a secret ID code and the like are additionally located next to the end position at steps 125 and S127. Then, at step S131, secret data codes are encrypted and control proceeds to step S132 where filler codes are located in a vacant region. After that, predetermined processes are performed at step S500. If no secret data are contained in the print data ("No" at step S123), control proceeds to step S133, skipping the processes of steps S125, "127, S131, S132 and S500.

Referring to FIG. 13, the predetermined processes are described. As shown in FIG. 13, at step S501, a pointer i is zeroed. This pointer i is for indicating bit positions which are subjected to dispersion processes at steps S507 to S517. With the zeroing, the processes start with a $0^{th}$ bit.

At step 503, the number of bits n is calculated for the vacant region located after the end position (see FIGS. 14A to 14C), i.e. the region where filler codes should originally be located, except the correction code range. This process is a process for calculating a constant which is utilized for obtaining pseudo random numbers R at step S513 described later.

At the subsequent step S505, a calculation is performed to obtain a sum m (see FIGS. 14D and 14E) of the number of bits of encrypted data and the number of bits of encoding key detection data. Specifically, the number of bits of secret data codes which are subjected to diffusion processes is grasped, so that a determination can be made, at the later step S519, as to whether or not the diffusion processes have been completed.

At the subsequent step S507, an exclusive OR operation (EXOR) is carried out with two-bite unit for the disclosure data codes and the encrypted data to obtain an operation result S. At step S509, the operation result S is set as a seed value of the pseudo random numbers of step S513. The seed value serves as a seed for generating pseudo random numbers using a predetermined calculation. The same seed value can generate completely identical random numbers. That is, the values and the order of generation of the pseudo random numbers at step S513 are univocally determined by the value of the operation result S. In this regard, the present processes are performed on the basis of the contents of the disclosure data codes.

At step S511, the pointer i is incremented, or counted up by "1". Thus, the bit position (i.e. position indicated by the pointer) subjected to the diffusion processes at step S517, for example, is counted up. In the above example, a first bit is indicated by incrementing the count from "0" to "1".

At the subsequent step S513, the pseudo random numbers R are obtained. This process is purposed to generate random numbers in a pseudo manner by carrying out predetermined information processing according to a predetermined random number generation algorithm, on the basis of the seed value mentioned above. The pseudo random numbers here are generated in a range of from 1 to n (n is the number of bits of the vacant region). For example a calculation formula "R= rand ( ) mod n+1" is used.

It should be appreciated that "rand ( )" is a function that returns a pseudo random number for the seed value S. Also, "x mod y" is a function for calculating a modulo value "y" for "x". Specifically, in the above calculation formula, an argument "x" (i.e. "rand ( )") before "mod", that is a value of the pseudo random number, is divided by an argument "y" (i.e. "n") after "mod", to which "1" is added to obtain the pseudo random numbers R. It should be appreciated that, as mentioned above, "n" is the number of bits in the vacant region.

In this way, when the pseudo random numbers R from 1 to n is calculated at step S513, it is determined, at the subsequent step S515, whether or not the pseudo random numbers R have already been generated. Specifically, if the same value is generated as the pseudo random number, the number of bits may be overwritten in the diffusion process performed at the subsequent step S517. Therefore, the process of step S515 is carried out so that a value arranged earlier in the same bit position can be prevented from being broken. Accordingly, if the same value is determined as already having been generated as a pseudo random number R ("Yes" at step S515), control returns to step S513 to again obtain the pseudo random numbers R.

When it is not determined, at step S515, that a pseudo random number R has the same value as an already generated one ("No" at step S515), control proceeds to step S517. At step S517, the value of an $i^{th}$ bit of the encrypted data (the position of the bit pointed by the pointer i) is set at an $R^{th}$ bit position of the vacant region, or the diffusion process is performed. In the above example, the value of the $1^{st}$ bit is set to the $R^{th}$ bit position in the vacant region. Thus, the information which is to be originally located at the $1^{st}$ bit position is shifted to the $R^{th}$ bit position by the irregularly generated random number.

At the subsequent step S519, it is determined whether or not the value of the pointer i has reached the end of the bit numbers (last bit) of the secret data codes subjected to the diffusion processes, that is, it is determined whether or not the diffusion processes have been completed. When the value of the pointer i coincides with the number of all the bits, it means that all the bits of the secret data codes have been applied with the diffusion processes of steps S507 to S517 ("Yes" at step S519). Then, the present processes are ended.

When the value of the pointer i does not coincide with the number of all the bits, it means that there still remain bits in the secret data codes, which bits have not been applied with the diffusion processes ("No" at step S519). Thus, control returns to step S511 where the pointer i is counted up to again perform, at step S513, the pseudo random number generating process.

In this way, the processes of steps S513 to S517 are repeatedly performed for all the bits of the secret data codes. Thus, the $1^{st}$ bit, $2^{nd}$ bit, $3^{rd}$ bit . . . $(n-1)^{th}$ bit and the $n^{th}$ bit of the bit information, which should originally be sequentially arranged, are shifted according to the irregularly varying pseudo random numbers R. Thus, when the predetermined processes of step S500 are finished, the secret data codes α and β before applied With the diffusion processes (FIG. 14A) are both separated into segments by a unit of bit and re-arranged, as shown in FIG. 14B. Also, the filler codes, which are similarly separated into segments by the diffusion processes, are re-arranged in the vacant region in a state being mixed with the secret data code segments.

Thus, the encrypted secret data codes are further scrambled, whereby the level of security can be much more raised.

In the present processes, alternative to such diffusion processes performed at steps S507 to S517, the bits may be reordered on the basis of a bit-position conversion table (conversion table), for example, with which bit position can be converted. Specifically, for example, the bit-position conversion table may be provided so that the bit positions can be converted according to the conversion rule, in which the $1^{st}$ bit is converted to the $4^{th}$ bit; the $2^{nd}$ bit, to the $13^{th}$ bit; the $3^{rd}$ bit, to the $1^{st}$ bit; the $4^{th}$ bit, to the $2^{nd}$ bit; the $5^{th}$ bit, to the $15^{th}$ bit; the $6^{th}$ bit, to the $11^{th}$ bit; the $7^{th}$ bit, to the $8^{th}$ bit; the $8^{th}$ bit, to the $3^{rd}$ bit; the $9^{th}$ bit, to the $10^{th}$ bit; the $10^{th}$ bit, to the $6^{th}$ bit; the $11^{th}$ bit, to the $12^{th}$ bit; the $12^{th}$ bit, to the $5^{th}$ bit; the $13^{th}$ bit, to the $9^{th}$ bit; the $14^{th}$ bit, to the $16^{th}$ bit; the $15^{th}$ bit, to the $7^{th}$ bit; and the $16^{th}$ bit, to the $14^{th}$ bit. Thus, a 16-bit data "1001011011010110" (96D6h), for example, is converted to "0101101001100001" (5A61h).

By allowing the secret data code to pass through such a bit-position conversion table, the hexadecimal notation "96D6h" of the data, for example, is converted to "5A61h" as mentioned above. This can be regarded as a technical idea in which a data value per se identified by the bits constituting the secret data code can be converted, on the basis of a predetermined conversion table. It should be appreciated that the data value conversion can be performed by using a predetermined data-value conversion formula, in which an inputted data X is duplicated, followed by subtracting 1 to obtain an output Y ($=X \times 2 - 1$).

Alternatively, the secret data code may be passed through a circular shift register, for example, so that the bit positions can be circulated and shifted to the side of the LSB (least significant bit) by a predetermined number of bits. In this case, the above 16-bit data example "1001011011010110" (96D6h) is converted to "0110100101101101" (696Dh). As a matter of course, the shift amount is not limited to 4 bits, but may be any of 1 to 15 bits. Also the shift direction may be toward the side of the MSB (most significant bit).

The 16 bits constituting the 16-bit structure exemplified here are equivalent to the sum m of the number of bits of the encrypted data and the number of bits of the decoding key detection data mentioned above. FIG. 14D illustrates an example of a format (encrypted data+decoding key detection data) resulting from the bit reordering or bit value conversion other than the diffusion processes described above. For comparison, FIG. 14E illustrates an example of a configuration of the secret data code produced by the code producing processes of the third embodiment.

At step S507 mentioned above, an exclusive OR operation (EXOR) has been carried out with two-bite unit for the disclosure data codes and the encrypted data to obtain the operation result S. The operation result S has then been set, at step S509, as a seed value of the pseudo random numbers. Alternative to the disclosure data codes, the specific information inherent to the QR code Q, e.g., error correction levels (L, M, Q and H) or model numbers (1 to 40), may be used together with the encrypted data to perform the exclusive OR operation (EXOR) and obtain the operation result S. As to the details of the error correction levels and the model numbers and the specifications, refer to the two-dimensional code symbols—QR codes—basic specification of Japanese Industrial Standards (JIS X 0510:2004).

Referring again to FIG. 12, after finishing the predetermined processes of step S500, control proceeds to step S133 where secret data codes are additionally located. At the subsequent step S134, it is determined whether or not secret data codes are present.

Specifically, if secret data codes are determined as being present at step S134, ("Yes" at step S134), the subsequent step S135 for adding filler codes is not required, because filler codes have already been added at step S132 described above. Thus, in this case, step S135 is skipped and control proceeds to step S137. On the other hand, if a secret data codes are determined as not being present, or if only the disclosure data codes are present ("No" at step S134), it means that no filler codes have yet been additionally located. Thus, in this case, filler codes are located at the subsequent step S135 and control proceeds to step S137.

At step S137, an error correction code is added, whereby the data codes with the formats shown in FIGS. 14A to 14C are produced. Thus, at the subsequent step S139, individual cells are produced on the basis of these data codes and arranged in the data blocks explained referring to FIG. 4.

As described above, in the QR code Q produced by the code producing processes which are executed by the MPU 11 of the QR code printer 10 according to the fifth embodiment, the secret data codes are applied with predetermined processes performed at step S500, and then located after the end ID code or after the end position identified by the end ID information. With the predetermined processes being applied, the secret data codes are ensured not to be recognized as to their presence. Thus, an attempt of reading the data after the end ID code may not even allow the operator to notice the presence of the secret data codes. In this way, the security level can be much more enhanced.

In the fifth embodiment described above, a process (corresponding to step S115 of FIG. 2) for reordering the disclosure and secret data is not interposed after step S113. In this regard, the print data contains data to be disclosed to a third party (disclosure data) and data to be kept in secret from a third party (secret data). If these data are disorderly located in the data record, the data may be reordered on the basis of the "position information indicating the positional relationship of the secret data in the data record", so that a group of the disclosure data and a group of the secret data can be obtained.

Thus, for example, when the print data transmitted from the computer 1 contains data in the order of disclosure data A, secret data α, disclosure data B and secret data β, these data can be reordered, at step S115, in the order of disclosure data A, disclosure data B, secret data α and secret data β. Thus, the disclosure data and the secret data can be grouped to facilitate the processes, for example, of adding the end ID code performed at the later step S121', or adding the secret ID code performed at step S125.

Sixth Embodiment

Figure 15:
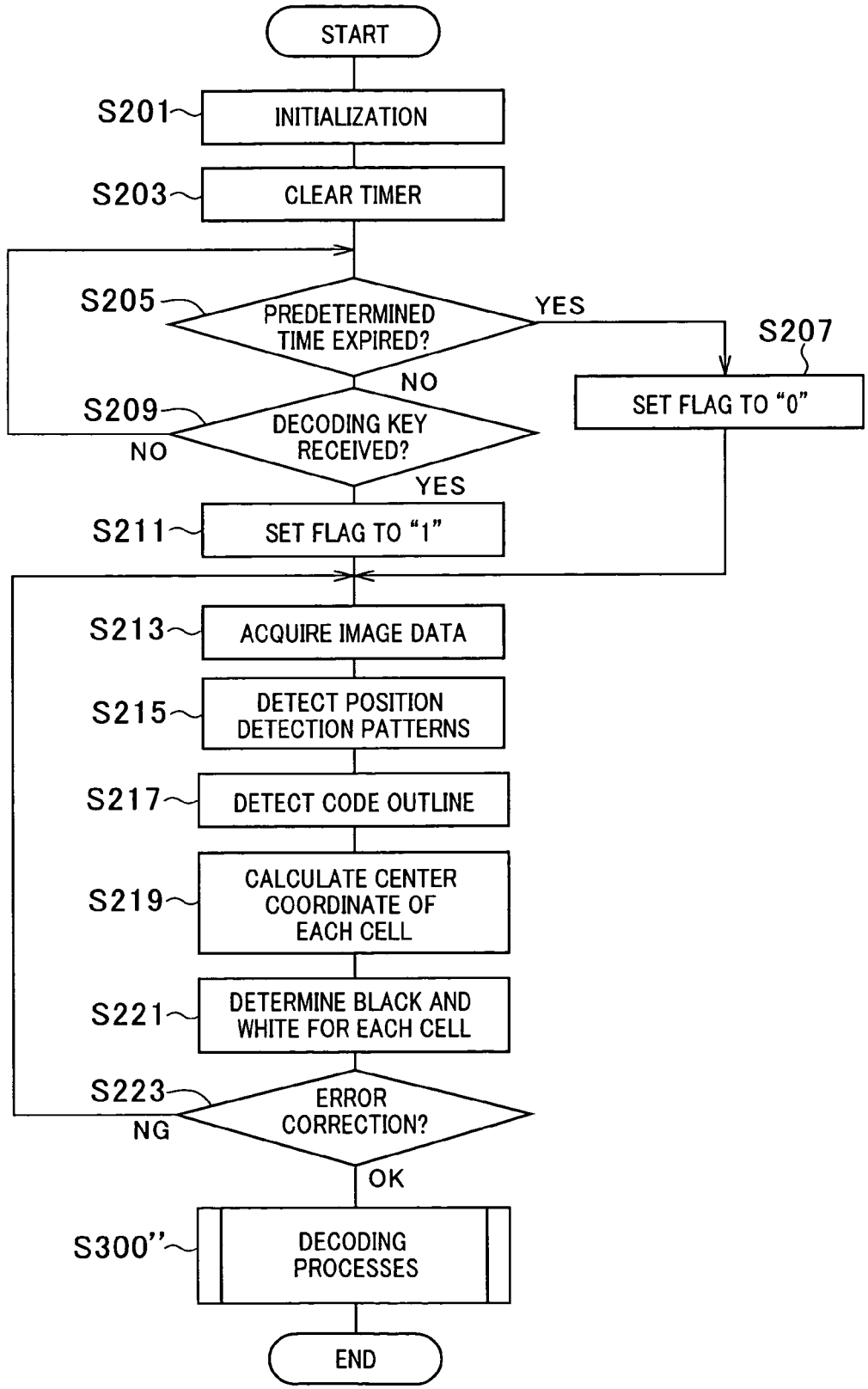
FIG. 15 is a flow diagram illustrating a flow of primary decoding processes executed by a control circuit of a QR code reader, according to a sixth embodiment of the present invention.
Figure 16:
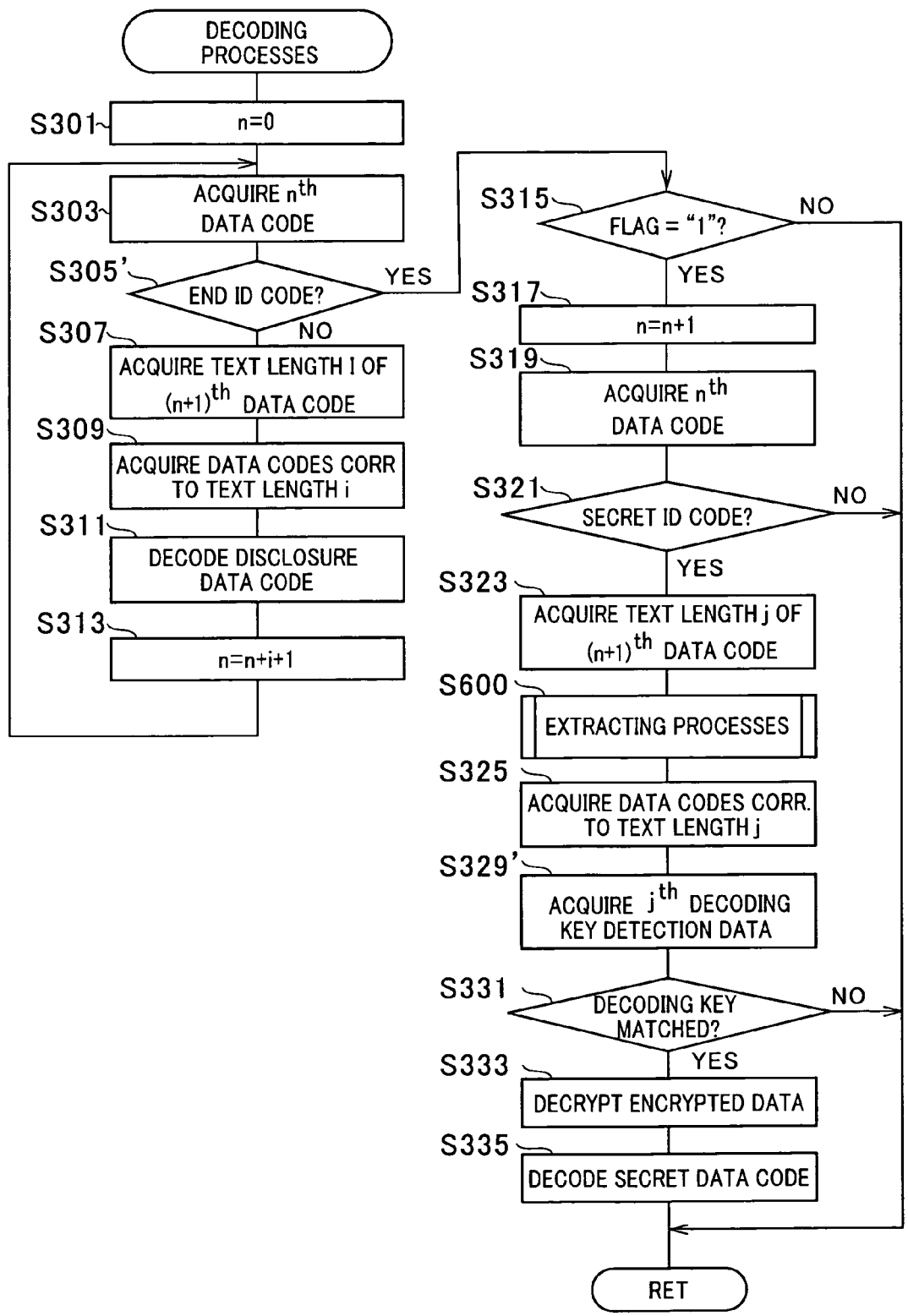
FIG. 16 is a flow diagram illustrating a flow of the secondary decoding processes of FIG. 15.
Figure 17:
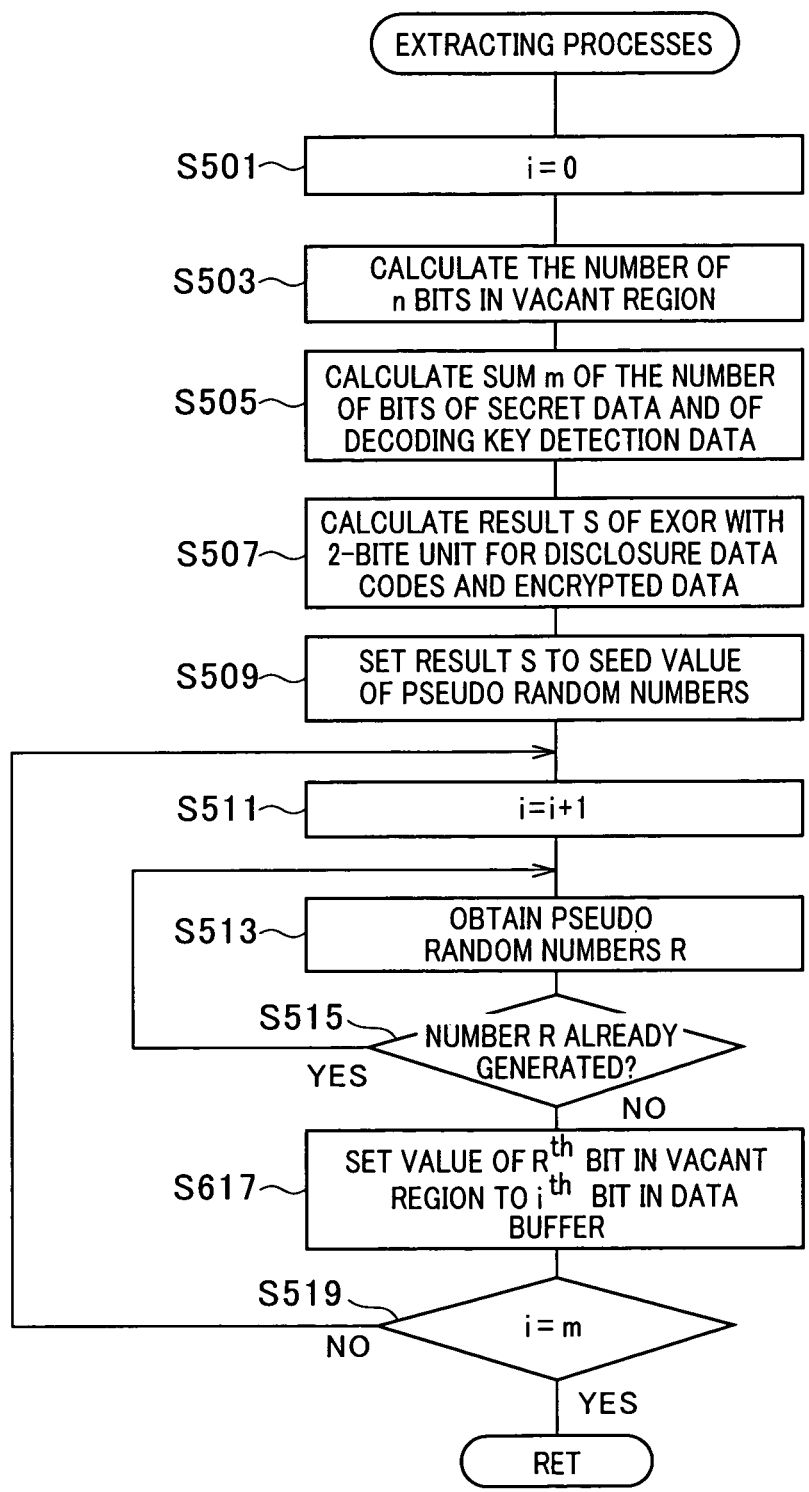
FIG. 17 is a flow diagram illustrating a flow of the extracting processes of FIG. 16.

Referring now to FIG. 15 to 17, hereinafter is described a sixth embodiment of the present invention.

According to the sixth embodiment, another QR code is decoded using the QR code reader 20. The "another QR code" described here uses a format in which the predetermined processes are applied to the secret data codes α, β and the like, as described referring to FIG. 14B, for example, to fill the vacant region.

FIG. 15 is a flow diagram illustrating primary decoding processes according to the sixth embodiment. As shown in the figure, the primary decoding processes are started by the control circuit 40 and the memory 35 activated by turning on the power of the QR code reader 20. Initialization is performed at step S201 first. Then, after expiration of a predetermined time at step S205 ("Yes" at step S205), or after receiving decoding keys at step S209 ("Yes" at step S209), image data are acquired at step S213. The image of the QR code Q is then recognized at steps S215, S217, S219 and S221. At step S223, it is determined whether or not error correction is possible. If the correction is determined as being possible ("OK" at step S223), the error correction is performed and control proceeds to step S300" where secondary decoding processes shown in FIG. 16 are carried out.

As shown in FIG. 16, in the secondary decoding processes of step S300", when an end position is found at steps S301 to S313 ("Yes" at step S305'), an $n^{th}$ data code indicated by the counter n is acquired at steps S315, S317 and S319. Then, it is determined, at step S321, whether or not the $n^{th}$ data code is a secret ID code. It should be appreciated that the term "end position" refers to an end position of a code string structured by disclosure data codes, which can be identified by an end ID code or end position data. When the $n^{th}$ data code is determined as being a secret ID code ("Yes" at step S321), control proceeds to step S323 where the number of codes (text length) j is acquired. Then, at step S600, predetermined extracting processes are performed.

When it is determined at step S321 that a secret ID code is located, it may be so configure, for example, that the host computer HST is notified of the fact that the QR code Q has a secret ID code. This enables the host computer HST to grasp the fact that the data codes after the end ID code are secret data codes. It may happen that data codes which are neither the filler codes nor the secret data codes (e.g., garbled filler codes which are no longer the filler codes) may be located in the code region (vacant portion of the code region) after the end ID code, where only the filler codes should originally be located. In this case, the information of the data codes as being the secret data codes will not be outputted to the host computer HST. Therefore, the occurrences of malfunction can be prevented, which malfunction would have otherwise been caused by decoding data codes other than the secret data codes.

Referring now to FIG. 17, the predetermined extracting processes of step S600 are described. It should be appreciated that the predetermined extracting processes illustrated in FIG. 17 are analogous to the contents of the information processing of the predetermined processes (FIG. 13) described in the fifth embodiment. Thus, substantially the same processing steps as those of the predetermined processes of the fifth embodiment are designated with the same references and the detailed explanation is omitted.

As shown in FIG. 17, in the predetermined extracting processes, the pointer i is zeroed at step S501. At step S503, the number of bits n after the end position is calculated (see FIGS. 14A to 14C). At step S505, the sum m of the number of bits of the encrypted data and the number of bits of the decoding key detection data is calculated (see FIGS. 14D and 14E). Then, at step S507, the exclusive OR operation (EXOR) is carried out with two-bite unit for the disclosure data codes and the encrypted data to obtain an operation result S. At the subsequent step S509, the operation result S is set as a seed value of the pseudo random numbers.

The seed value set at step S509 serves for generating the pseudo random numbers by the predetermined calculation, as described in the fifth embodiment. The same seed value can generate completely identical random numbers. Accordingly, if the QR codes Q are identical, the seed values resulting from the predetermined processes of FIG. 13 and the extracting processes of the present embodiment are the same. Accordingly, the values of the pseudo random numbers and the order of generation of these numbers at the subsequent step S513 will be identical.

Thus, at step S513, the pseudo random numbers R are obtained. At the subsequent step S515, if a pseudo random number R is determined as not having the same value as that of an already generated one ("No" at step S515), control proceeds to step S617. At step S617, the value of the $R^{th}$ bit in the vacant region is set to the $i^{th}$ bit (position indicated by the pointer i) in an encrypted data buffer.

Specifically, in the predetermined processes of the fifth embodiment, step S517 has performed a process of setting a value of the $i^{th}$ bit (position of the bit indicated by the pointer i) of the encrypted data to the $R^{th}$ bit in the vacant region. For example, the value of the $1^{st}$ bit has been set at the $R^{th}$ bit in the vacant region. Conversely, at step S617 of the present extracting processes, the value of the $R^{th}$ bit in the vacant region is set to the $i^{th}$ bit (position of the bit indicated by the pointer i) in the encrypted data buffer. For example, the value of the $R^{th}$ bit in the vacant region is set at the $1^{st}$ bit of the encrypted data buffer.

Thus, the value of the $i^{th}$ bit in the encrypted data that has been set to the $R^{th}$ bit in the vacant region in the predetermined processes of the fifth embodiment, is set to the $i^{th}$ bit in the encrypted data buffer. In this way, the secret data code segments that have been separated into segments by a bit unit can be restored. In other words, intensive restoration processes can be performed at step S617, for example.

Then, at step S519, when the pointer i coincides with the total number of bits of the secret data codes, it means that all the bits of the secret data codes have been subjected to the intensive restoration processes of steps S507 to S517 described above ("Yes" at step S519). In this case, the extracting processes are ended. On the other hand, when the pointer i does not coincide with the total number of bits of the secret data codes, it means that some bits in the secret data codes still remain without being subjected to the restoration processes ("No" at step S519). In this case, control returns to step S511 where the pointer i is counted up to again perform the pseudo random number generation process at step S513.

Referring again to FIG. 16, after finishing the predetermined extracting processes at step S600, control proceeds to step S325 to acquire data codes corresponding to the text length j. Then, at the subsequent step S329', the $j^{th}$ decoding key detection data (key identifying information) is acquired.

Then, at step S331, it is determined whether or not the decoding key received from the host computer HST at step S209 is suitable for (matches) a key for decrypting the encrypted data of the $j^{th}$ secret data code, on the basis of the decoding key detection data acquired at step S329'. When the decoding key is determined as being matched ("Yes" at step S331), the encrypted data is decrypted at the subsequent step S333.

On the other hand, when the decoding key cannot be determined as being matched at step S331 ("No" at step S331), the present secondary decoding processes are ended without decrypting the $n^{th}$ secret data code. Thus, upon performing the process of decoding the secret data code at step S335, step S300" of FIG. 15 is ended to end the primary decoding processes.

In the present extracting processes, alternative to the intensive restoration processes performed at steps S507 to S617, bits may be reordered on the basis of a reverse bit-position conversion table, for example, which is able to convert the bit positions in the reverse direction. Specifically, for example, the reverse bit-position conversion table of the sixth embodiment may be provided so that the bit positions can be reversely converted according to a reverse conversion rule, in which the $1^{st}$ bit is converted to the $3^{rd}$ bit; the $2^{nd}$ bit, to the $4^{th}$ bit; the $3^{rd}$ bit, to the $8^{th}$ bit; the $4^{th}$ bit, to the $1^{st}$ bit; the $5^{th}$ bit, to the $12^{th}$ bit; the $6^{th}$ bit, to the $10^{th}$ bit; the $7^{th}$ bit, to the $15^{th}$ bit; the $8^{th}$ bit, to the $7^{th}$ bit; the $9^{th}$ bit, to the $13^{th}$ bit; the $10^{th}$ bit to the $9^{th}$ bit; $11^{th}$ bit, to the $6^{th}$ bit; the $12^{th}$ bit, to the $11^{th}$ bit; the $13^{th}$ bit, to the $2^{nd}$ bit; the $14^{th}$ bit, to the $16^{th}$ bit; the $15^{th}$ bit to the $5^{th}$ bit; and the $16^{th}$ bit, to the $14^{th}$ bit. Thus, a 16-bit data "0101101101100001" (5A61h), for example, is converted to the original "1001011011010110" (96D6h).

Alternative to passing the secret data codes through such a reverse bit-position conversion table, a reverse data-value conversion table may be used, which is able to reversely convert the data values specified by the bits structuring the secret data codes. In this regard, in the data-value conversion table explained in the fifth embodiment, the hexadecimal notation "96D6h" of data has been converted to "5A61h". Accordingly, restoration processes can be performed by performing conversion on the basis of the predetermined reverse data-value conversion table which is able to reversely convert "5A61h" to "96D6h".

Alternative to passing the secret data codes through such a reverse bit-position conversion table, a reverse data-value conversion formula may be use, which is able to reversely convert the data value identified by the bits structuring the secret data code. In this regard, in the predetermined data-value conversion formula explained in the fifth embodiment, the input data X has been duplicated, followed by subtraction of 1 to obtain the output Y (=X×2−1). Conversely, an addition of 1 to an input data X' may be followed by a division by 2 to obtain an output Y' (=(X'+1)/2). Thus, restoration processes may be performed.

In case of passing the secret data codes through the circular shift register explained in the fifth embodiment, restoration processes may be performed by using a circular shift register which allows shifting in the direction reverse of the predetermined processes of the fifth embodiment. For example, for the above example of the 16-bit data structure, shifting has been performed, by 4 bits, to the side of the LSB in the predetermined processes to convert "1001011011010110" (96D6h) to "0110100101101101" (696Dh). To perform restoration processes, shifting may be performed, by 4 bits, in the reverse direction, i.e. toward the side of the MSB to there by obtain "1001011011010110" (96D6h).

Similar to the fifth embodiment, the seed value of the pseudo random numbers, which is set at step S509 may be obtained using the specific information inherent to the QR code Q, e.g., error correction levels (L, M, Q and H) or model numbers (1 to 40), together with the encrypted data to perform the exclusive OR operation (EXOR) and obtain the operation result S. As to the details of the error correction levels and the model numbers and the specifications, refer to the two-dimensional code symbols—QR codes—basic specification of Japanese Industrial Standards (JIS X 0510: 2004).

It should be appreciated that, at steps S303 to S313, decoding is performed by acquiring normal data codes which should originally be decoded, being located before the end position (first data codes, or disclosure data codes). Thus, the control circuit 40 and the like executing these steps may correspond to the "first decoding means" recited in the claims.

Also, at step S321, the $n^{th}$ data code acquired at step S319 is subjected to the process for determining whether or not it is the secret ID code. Thus, the control circuit 40 and the like executing step S321 may correspond to the "data code determining means" or the "secret ID code determining means" recited in the claims. Further, the control circuit 40 and the like executing step S333 may correspond to the "decoding means" recited in the claims.

In addition, steps S319 and S323 to S335 perform processes of acquiring and decoding data codes which are located after the end position and should not originally be decoded (second data codes, or secret data codes). Thus, the control circuit 40 and the like executing these steps may correspond to the "second decoding means" recited in the claims.

The QR code reader 20 according to the sixth embodiment described above is able to decode secret data codes (second data codes) even when the secret data codes are located in a code region after the end ID code (vacant portion of the code region), for example, where data codes should not originally be located. Thus, the data codes can be decoded, which are present in the vacant portion of the code region where codewords are to be located.

In the decoding processes described above, it has been so configured that the $j^{th}$ decoding key detection data is acquired at step S329'. In this regard, as described in the fifth embodiment, a process of reordering the disclosure and secret data (corresponding to step S115 of FIG. 2) may be interposed after the process of step S113. Then, the data may be reordered on the basis of the "position information indicating the positional relationship of the secret data in the data record", to obtain a group of the disclosure data and a group of the secret data. When such a process is performed, step S329' may perform a process of separating the "start position" from the secret data codes, and locating the secret data having decoded secret data codes, in a positional relationship in the data record before encoding, on the basis of the separated "start position".

Thus, even when data before being encoded as codewords, are disorderly located in the positional relationship in the data record, the decoded data may be located in the positional relationship before encoding, on the basis of the position information. In this case, the control circuit 40 and the like executing the process of "separating the 'start position' from the secret data codes" may correspond to the "position information separating means" recited in the claims. Also, the control circuit 40 and the like executing the process of "locating the secret data having the decoded secret data code in the data record so as to have a positional relationship before encoding, on the basis of the separated 'start position'" may correspond to the "data locating means" recited in the claims.

Seventh Embodiment

Figure 18:
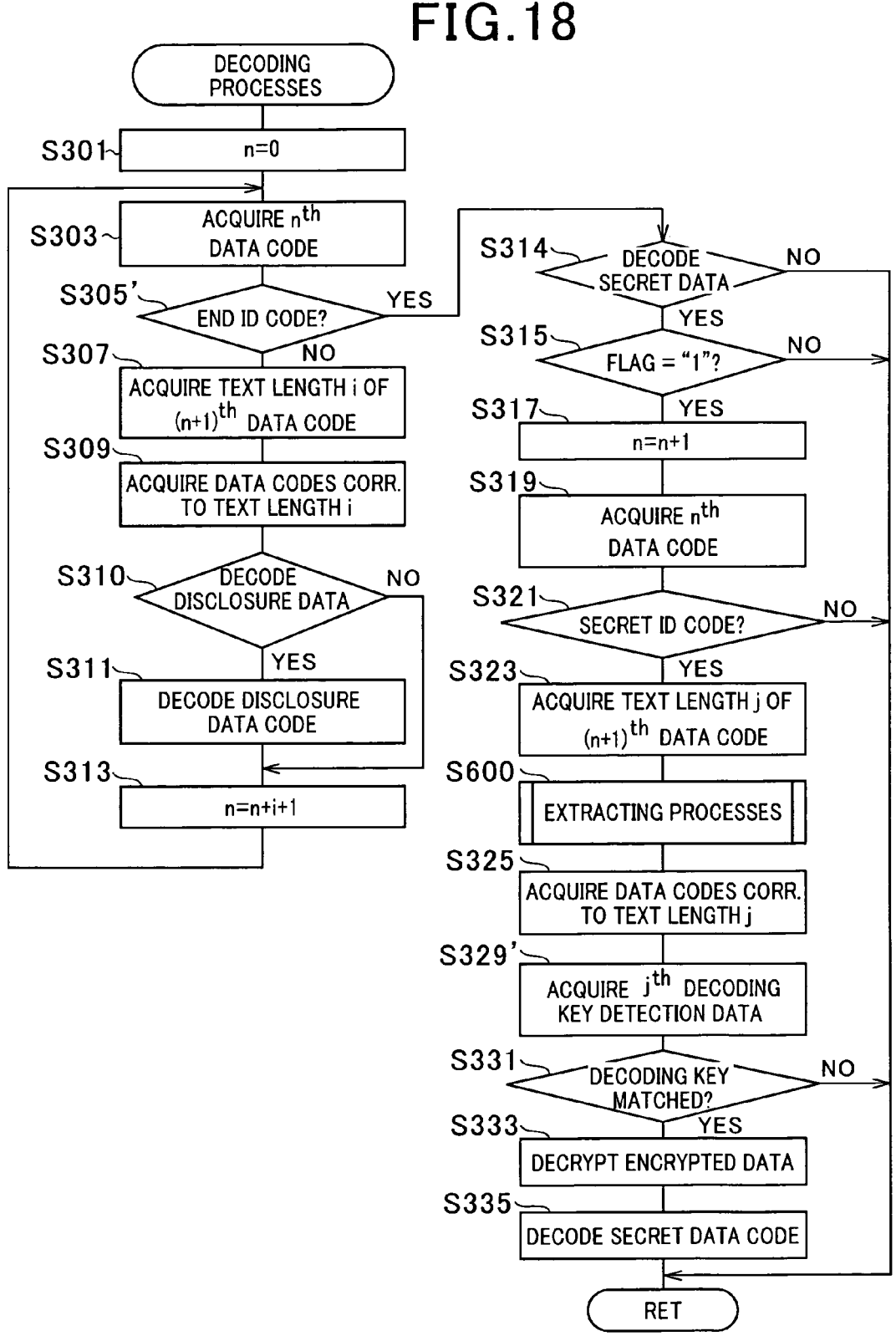
FIG. 18 is a flow diagram illustrating a flow of decoding processes executed by a control circuit of a QR code reader, according to a seventh embodiment of the present invention.
Figure 19:
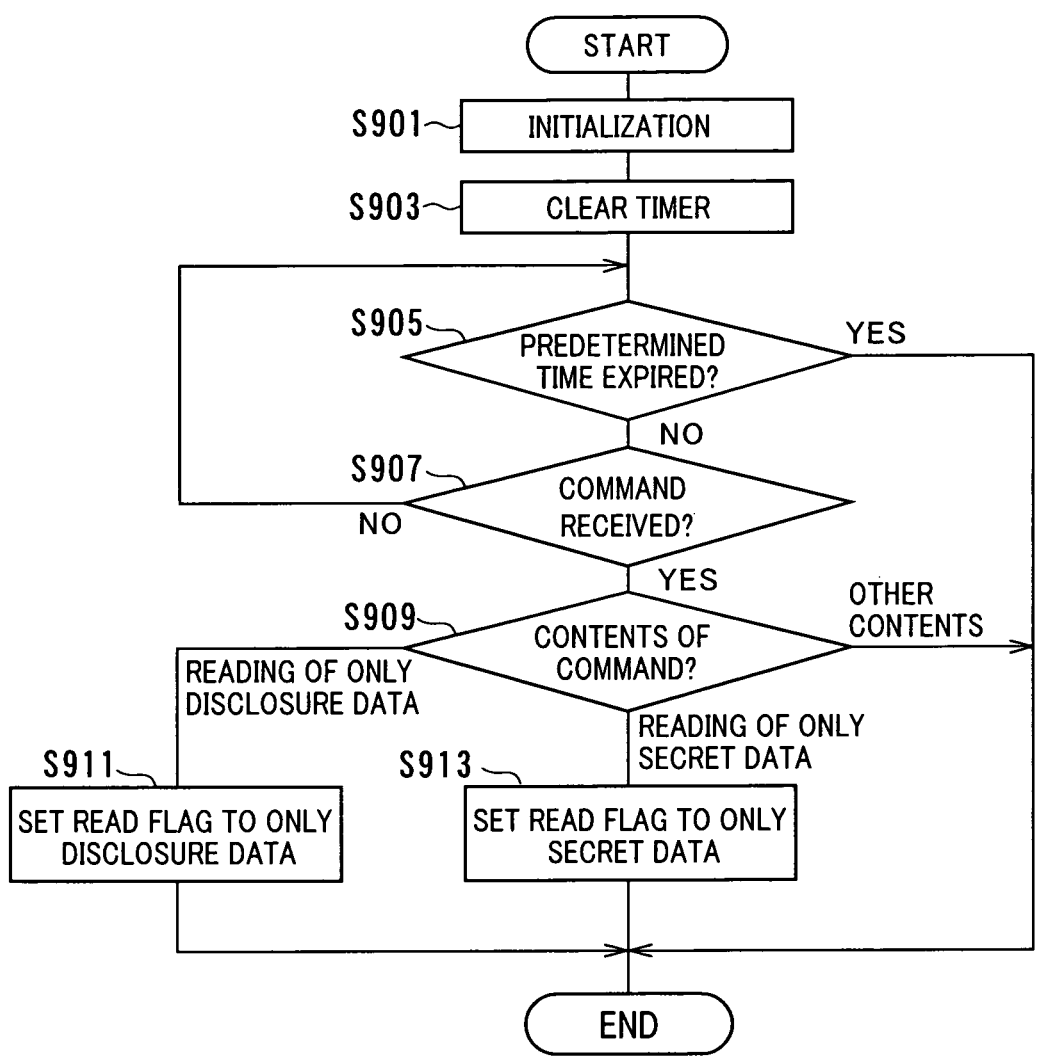
FIG. 19 is a flow diagram illustrating a flow of read flag setting processes executed by a control circuit of the QR code reader, according to the seventh embodiment.

Referring to FIGS. 18 and 19, hereinafter will be described a seventh embodiment of the present invention.

FIGS. 18 and 19 illustrate flow diagrams of decoding processes for the QR code Q performed by the QR code reader 20, according to the seventh embodiment. It should be appreciated that the QR code Q here is the QR code containing the secret data codes in the first to fifth embodiments described above.

In the seventh embodiment, primary decoding processes are not shown. FIG. 18 is a flow diagram of secondary decoding processes that can replace the secondary decoding processes performed at steps S300, S300' and S300", which are illustrated in FIGS. 6, 10 and 15, respectively. The secondary decoding processes illustrated in FIG. 18 represent the seventh embodiment.

As shown in FIG. 18, in the secondary decoding processes, when it is determined, at step S305', that there is no data corresponding to the end position ("No" at step S305'), control proceeds to the subsequent step. It should be appreciated that the end position refers to is a position locating at the end of a code string structured by disclosure data codes, and can be identified by an end ID code or end position data. At steps S307 and S309, data codes corresponding to the text length i are acquired, and then at step S310, a determination is made as to whether or not the disclosure data codes are to be decoded.

Specifically, at step S310, based on the states of "read flag S", which will be described later referring to FIG. 19, it is determined whether or not the information for decoding the disclosure data codes is set to the read flag S. The states of the read flag S are expressed by: (1) flag S=1 for decoding only disclosure data codes; (2) flag S=2 for decoding only secret data codes; and (3) flag S=0 for decoding both disclosure and secret data codes. The read flag S is set, for example, in a predetermined region of the memory 35 or in a register, constituting the QR code reader 20. The flag S is set in a read flag setting process (see FIG. 19), which will be described later.

In the case where the flag S=1 or S=0 is set as the read flag ("Yes" at step S310), control proceeds to the subsequent step S311 where the process of decoding the disclosure data is performed. In the case where the flag S=2 is set as the read flag ("No" at step S310), the process at step S311 is skipped, and control proceeds to steps S313 and S303, for example, where the subsequent data code is acquired.

On the other hand, when the end position (position locating at the end of a code string structured by disclosure data codes, and can be identified by an end ID code or end position data) is found at steps S301 to S313 ("Yes" at step S305'), control proceeds to step S314 where it is determined whether or not the secret data codes are to be decoded.

Specifically, contrary to the process of step S310 described above, a determination is made, at step S314, on the basis of the read flag S, as to whether or not the secret data codes should be decoded. More specifically, in the case where the flag S=2 or S=0 is set as the read flag ("Yes" at step S314), control proceeds to the subsequent steps S315 to S335 where the secret data codes are decoded. In the case where the flag S=1 is set as the read flag ("No" at step S314), the present secondary decoding process are ended.

Referring now to FIG. 19, the read flag setting processes are described. The read flag setting processes are included in a maintenance program which is started when changing, cancelling or initializing various settings (e.g., on/off state of the beep sound, or on/off state of the backlight of the LCD 46) of the hardware constituting the QR code reader 20. Thus, the read flag setting process is not included in the normal primary decoding processes (FIGS. 6, 10 and 15). The flow diagram for performing maintenance processes based on the maintenance program and its description are omitted here.

As shown in FIG. 19, in the read flag setting processes, initialization is performed first, at step S901, including setting the read flag to "0" (S=0). Then, at step S903, a timer value is cleared. The timer is used, at step S905, for counting passage of time to determine whether or not a predetermined time has expired.

If it is determined at step S905 that the predetermined time has not yet expired ("No" at step S905), it is determined then at the subsequent step S907 whether or not a command has been received. For example, this command is received from the host computer HST, or inputted from the operation switch 42 constituting the QR code reader 20, in the maintenance program mentioned above.

If it is determined at step S907 that the command has not yet been received ("No" at step S907), control returns to step S905 where a determination is made again as to the expiration of the predetermined time. On the other hand, when the command is determined as having been received ("Yes" at step S907), control proceeds to the subsequent step S909 where the contents of the received command is judged.

Specifically, the judgment made at step S909 is as follows. That is, when the command is for (1) decoding only the disclosure data codes, "1" is set (S=1) at the read flag S at step S911. When the command is for (2) decoding only the secret data codes, the read flag S is set to "2" (S=2) at step S913. When the command is neither for (1) nor (2), the read flag S is left being set to "0" to end the read flag setting processes. In other words, in this case, "0" which is set by default at step S901 mentioned above is used as it is, so as to keep the read flag S performing (3) decoding both the disclosure and secret data codes.

After the read flag has been set at step S911 or S913, the read flag setting processes are ended. It should be appreciated that steps S310 and S314 may correspond to the "decoding function selecting means" recited in the claims. Also, step S311 may correspond to the "decoding function of the first data codes" recited in the claims, while step S335 may correspond to the "decoding function of the second data codes" recited in the claims.

As described above, in the QR code reader 20 according to the seventh embodiment, the user of the QR code reader 20 can select at least one of: decoding the disclosure data codes; and decoding the secret data codes. Accordingly, decoding time that would be taken for performing unnecessary decoding processes can be saved, in such cases as where the user wishes to read the secret data codes but not the disclosure data codes, and vice versa. As a result, decoding time can be shortened.

In some of the embodiments described above, such as the first embodiment (FIG. 2) and the third embodiment (FIG. 8), an error correction code is produced at step S119 of the code producing processes. However, the error correction code is not necessarily required to be produced at step S119. Alternatively, for example, the flow of the code producing processes may be configured in such a way that the process corresponding to the process of step S119 (error correction code producing process) is executed at an earlier step, for example, of adding an error correction code (step S137).

Eighth Embodiment

Referring to FIGS. 1A, 1B, 20 and 22, an eight embodiment of the present will now be described.

The present embodiment adopts the QR code printer 10 already described as its configuration with reference to FIGS. 1A and 1B.

Thus, according to the QR code printer 10, the print data outputted from the computer 1 and inputted to the QR code printer 10 is temporarily stored in the buffer region of the memory 12 through the interface 13, and then subjected to the code producing processes described below.

Figure 20:
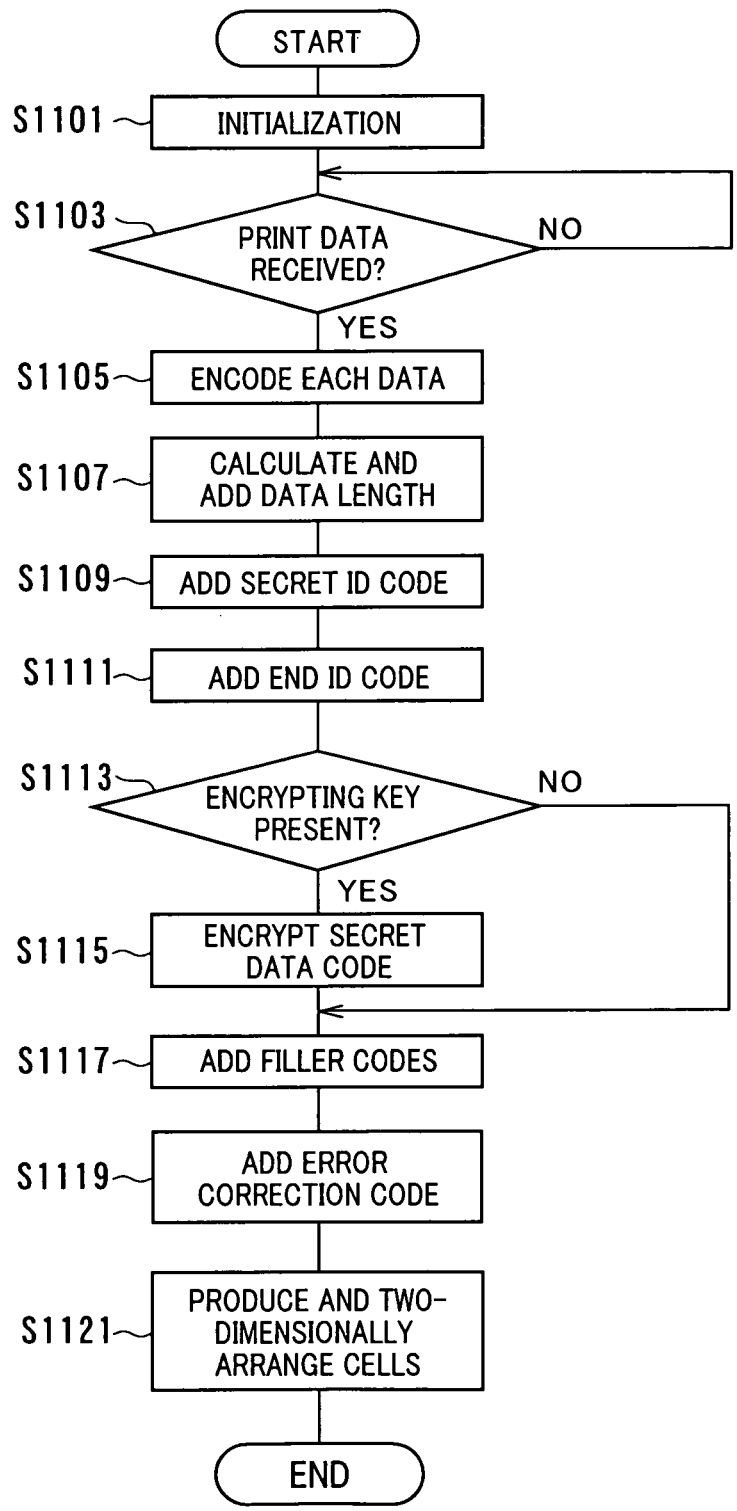
FIG. 20 is a flow diagram illustrating a flow of code producing processes executed by the QR code printer, according to an eighth embodiment of the present invention.
Figure 21:
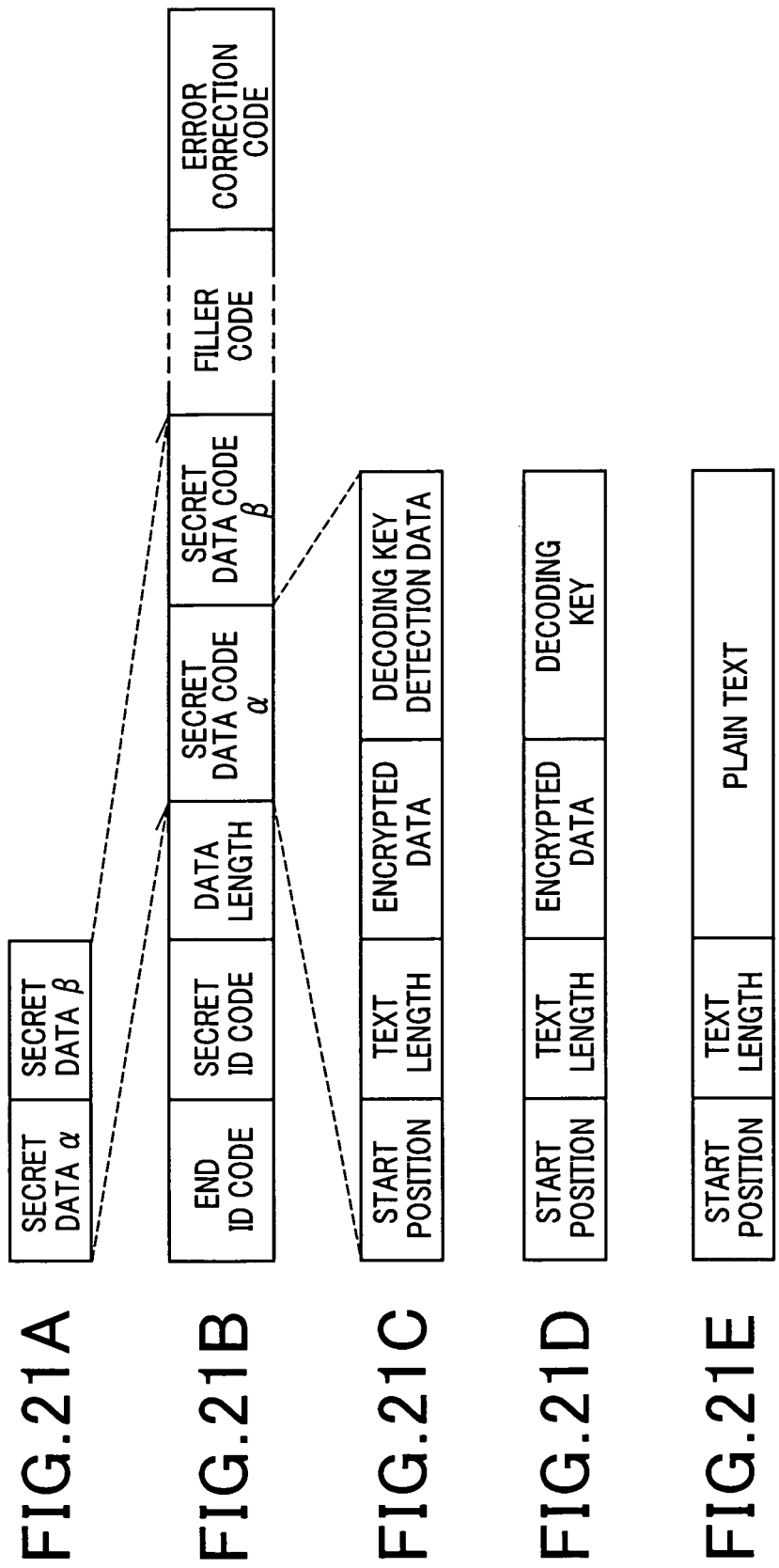
FIGS. 21A to 21E are explanatory views illustrating examples of formats for data and codes which are subjected to information processing in the code producing processes illustrated in FIG. 20.

With reference to FIGS. 20, 21, and 4, hereinafter is described the code producing processes. FIG. 20 is a flow diagram illustrating a flow of the code producing processes. FIG. 21A-21E illustrate examples of formats of the data and codes subjected to information processing in the code producing processes illustrated in FIG. 20. In particular, FIG. 21A is an example of data record of print data, FIG. 21B is an example after addition of codes, FIG. 21C is an example of a configuration of the secret code illustrated in FIG. 21B, FIG. 21D is another example of a configuration of the secret code illustrated in FIG. 21B, and FIG. 21E is still another example of a configuration of the secret code illustrated in FIG. 21B.

As shown in FIG. 20, the code producing processes is started by the MPU 11 and the memory 12 which are activated by turning on the power of the QR code printer 10. First, initialization is performed at step S1101. In this process, the operation region and the buffer region for storing data in the memory 12 are cleared, or predetermined flags, counters and the like, in the memory 12 are cleared.

At step S1103, it is determined whether or not a print data has been received. This step is repeated until the print data is received ("No" at step S1103). When the print data are determined as being received ("Yes" at step S1103), control proceeds to the subsequent step S105. It should be appreciated that the received data include encrypting key data other than the print data. Specifically, as will be described later, when secret data codes are required to be encrypted, the encrypting key data is also received at this step S1103. The print data received here are all intended to be kept in secret from a third party (secret data), and thus should not include data to be disclosed to a third party (disclosure data). Accordingly, these print data are all processed as secret data in the following description.

At the subsequent step S1105, the secret data are encoded according to the basic specification (JIS X 0510:2004) of JIS. Thus, the secret data are encoded as codewords to produce secret data codes. For example, when the print data received at step S1103 are secret data α and β, as shown in FIG. 21A, a sum of data lengths of the secret data codes α and β encoded at step S1105 is calculated and added immediately before the secret data code α, as shown in FIG. 21B.

At the subsequent Step S1107, the lengths of the secret data codes are calculated, encoded, and added immediately before the secret data code. Thus, the region and range for locating the secret data codes can be grasped. Owing to this, when a QR code Q produced in the present code producing processes is decoded by a QR code reader, for example, it is possible to recognize how far the secret data codes are present or whether the secret data codes are encrypted data codes.

At step S1109, the secret ID code is additionally located before the data lengths that have been coded at step S1107. The secret ID code explicitly expresses that the data codes that are located immediately after an end ID code that will be added at the subsequent step S1111, are the "data codes that have been coded as codewords representing the data". Owing to this, when the QR code Q produced in the present code producing processes is decoded by the QR code reader, for example, it is possible to recognize the codes which contain the secret data codes in the QR code Q. Thus, data to be excluded from reading or garbled data, for example, can be prevented from being erroneously recognized and read as the secret data codes. Accordingly, malfunction that would otherwise have been caused by the reading based on the erroneous recognition can also be prevented from occurring.

Then, at the subsequent step S1111, the end ID code is added immediately before the secret ID code. For example, the end ID code is a 4-bit pattern of "0000". In the present embodiment, no disclosure data are contained in the print data received at step S1103 as described above. Therefore, as shown in FIG. 21B, the disclosure data which should normally reside immediately before the end ID code is absent, and thus the end ID code is positioned at the head.

Going through the processes at steps S1105 to S1111 as described above, a filler code or an error correction code may be added after the secret data codes. In the present embodiment, however, a process of encrypting the secret data codes is performed after these processes, as shown in FIG. 21C.

Specifically, at step S1113, it is determined whether or not encrypting keys are present to determine whether or not the secret data codes are required to be encrypted. In other words, in the case where the encrypting key data have been received from the computer 1 at step S1103, the encrypting keys are determined as being present ("Yes" at step S1113), and control proceeds to step S1115 to perform an encrypting process. Meanwhile, in the case where no encrypting keys are received from the computer 1 at step S1103, the encrypting keys are determined as not being present ("No" at step S1113). Thus, the encrypting process at step S1115 is skipped, and control proceeds to step S1117.

Even when the encrypting key data are not received at step S1103, if the computer 1 holds the encrypting keys in information storage media, such as the memory 12 or the hard disc, it is determined that the encrypting keys are present ("Yes" at step S1113). Accordingly, the encrypting process is performed at step S1115.

At step S1115, the secret data codes are encrypted. In this process, the secret data codes may be encrypted by using, for example, the known composite visual cryptography (composite visual secret distribution process). In this way, security can be enhanced comparing with the case where plain-text data with no encryption is added.

As can be seen from the example illustrated in FIG. 21C, for example, the secret data code α is encrypted to obtain the "encrypted data", and at the same time a "start position", a "text length" and a "decoding key detection data" are produced. The initially located "start position" is given as the position information of the encrypted secret data. When the head of the print data is imparted with an address zero, a representable address value may correspond to this "start position". The subsequent "text length" is the number of characters of the encrypted secret data. It may sometimes happen that data before being encoded as codewords, may be disorderly located in a positional relationship in the data record. Even in such a case, in decoding the QR code Q produced by the present code producing processes by using a QR code reader, for example, the decoded data can be located in the data record so as to have the positional relationship before encoding, on the basis of the position information described above.

The "decoding key detection data" added last is the key identifying information, with which a decoding key for decrypting the encryption can be identified. When the key cryptography (also referred to as "secret key cryptography") is common between the encrypting keys and the decoding keys, the decoding key detection data can also identify the encrypting keys. Thus, in decoding the QR code Q produced by the present code producing processes by using a QR code reader, for example, the decoding keys (keys enabling decoding) can be readily identified for the secret data codes, or a determination can be made as to whether or not the key in question is a decoding key.

The secret data code $\beta$ is configured in the similar manner as the secret data code $\alpha$. The same information as that of the decoding key for decoding the secret data $\alpha$ may be added here so as to serve as the "decoding key detection data". Alternatively, when the secret data of the secret data code $\beta$ is encrypted using an encrypting key different from that of the secret data code $\alpha$, different "decoding key detection data" for identifying a decoding key may be added. Thus, in decoding the QR code Q produced by the present code producing processes by using a QR code reader, for example, a key for enabling decoding can be readily identified for the each of the secret data codes, or a determination can be made as to whether or not the key in question is a decoding key.

At the subsequent step S1117, filler codes are added after the secret data code according to the basic specification (JIS X 0510:2004) of JIS. Then, at step S1119, an error correction symbol for the secret data is produced according to the basic specification (JIS X 0510:2004) of JIS. The symbol is further encoded to produce an error correction code.

At step S1121, individual cells are produced on the basis of the data codes produced at step S1119, and then located in the data blocks illustrated in FIG. 4. Specifically, the QR code of type 1 illustrated in FIG. 4 is configured to have a square shape whose one side corresponds to 21 cells (modules). Thus, the code region except for position detection patterns provided at the three corners, form information areas (shaded areas in FIG. 4) and timing patterns, is used for locating 26 data blocks (A0-A25) each consisting of 8 cells arranged in 4 lines and 2 rows.

For example, in the example illustrated in FIG. 21B, the end ID code is located in block A0 corresponding to the head of the data region. Further, block A1 and the subsequent blocks, in which filler codes are normally located, are used for locating other codes. That is, the secret ID code is located in block A1, the data length is located in block A2, the secret ID code $\alpha$ is located in blocks A3 to A6, and the secret ID code $\beta$ is located in blocks A7 to A9. Similar to the normally used QR codes, the error correction code is located in the remaining blocks A20 to A25. Filler codes are arranged in the empty spaces inbetween, which are blocks A10 to A19. Blocks A15 and A18, which are arranged with a timing pattern being interposed, are divided into blocks A15 and A15', and blocks A18 and A18', respectively.

As shown in FIG. 21D, the decoding key per se may be added, at step S1115, instead of adding the "decoding key detection data". Thus, in decoding the QR code Q produced by the present code producing processes by using a QR code reader, for example, the secret data code $\alpha$ can be decoded to obtain the original plain text, even when, for example, the QR code reader does not have the decoding key for the secret data code $\alpha$.

Similarly, as to the secret data code $\beta$, the decoding key per se may be added instead of adding the "decoding key detection data". The added decoding key may be the same as the one for decoding the secret data code $\alpha$. Alternatively, when the secret data of the secret data code $\beta$ is encrypted using an encrypting key different from that of the secret data code $\alpha$, a different decoding key corresponding to the different encrypting key may be added. Thus, in decoding the QR code Q produced by the present code producing processes by using a QR code reader, for example, the secret data code $\beta$ can be decoded to obtain the original plain text, even when, for example, the QR code reader does not have the decoding key for the secret data code $\beta$.

It may sometimes be determined at step S1113 that an encrypting key is not present ("No" at step S1113). In such a case, as illustrated in FIG. 21E, an additional step may be provided between steps S1113 and S1117. In this additional step, the "start position" and the "text length" that have been added at step S1115 may be added before the plain text data which are not encrypted. Also, it may sometimes happen that data before being encoded as codewords, may be disorderly located in a positional relationship of the data record. Even in such a case, in decoding the QR code Q produced by the present code producing processes by using a QR code reader, for example, the decoded data can be located in the data record so as to have the positional relationship before encoding, on the basis of the position information.

As described above, the QR code printer 10 according to the eighth embodiment of the present invention can produce the QR code Q by executing the code producing processes with the aid of the MPU 11. In the QR code Q, the end ID code is located, at step S1111, in the initial portion of the code region, and the secret data codes are located, at step S1111, after the end ID code, replacing a part or all of the filler codes. That is, the end ID code is located at the head of the data codes (in the initial portion of the code region), whereby data codes including no disclosure data code can be produced (total number of disclosure codes is zero), with the secret data codes being located after the end ID code, replacing a part or all of the filler codes.

Thus, the secret data codes located after the end ID code are excluded from reading in a general purpose reader. Accordingly, in this case, since the general purpose reader recognizes as if a vacant (empty) QR code has been read, in which no encoded data are present, the user of the reader does not recognize the presence of the secret data. In this way, the presence of the secret data can be prevented from being recognized by the user of the general purpose reader.

Thus, in the general purpose reader, even when such secret data codes are present, the data codes corresponding to the secret data codes are not indicated on the screen. Accordingly, the presence of the secret data can be prevented from being recognized by the user. Further, the user may not have mistrust and may not be inadvertently motivated to decrypt such secret data codes. In addition, even when the data corresponding to the decoding data for the secret data codes are control data, for example, such data will not be indicated on the screen and thus the screen view will not be distorted.

The eighth embodiment has been described exemplifying a case where the QR code Q is printed on the label P by the QR code printer 10. The present invention is not limited to this embodiment, but may involve any components that can visually express the QR code Q.

For example, it may be so configured that the code producing processes illustrated in FIG. 20 are executed by the computer unit 2 to indicate the QR code Q on the display 3. In this case, the following technical idea may constitute:

That is, the technical idea of: "A program for producing two-dimensional codes, the program being for functioning a computer as a two-dimensional code producing device in which, when the total number of disclosure data codes, which are encoded as codewords representing the disclosure data, is less than a value corresponding to a capacity that can be accommodated in the code region for locating the codewords, an end ID code indicating an end of a code string constituted of the disclosure data codes that are located in the code region, is located at an end of the code string, and filler codes representing no data are located in a vacant portion of the code region, characterized in that: the disclosure data codes are absent, that is, the total number of the disclosure data codes is zero; the end ID code is located at an initial portion of the code data; and secret data codes encoded as codewords representing secret data are located after the end ID code, replacing a part or all of the filler codes".

Thus, with the program for producing a two-dimensional code, the computer functioning as a two-dimensional code producing device may provide the advantages similar to the MPU 11, for example, of the QR code printer 10 described above.

The eighth embodiment has been described exemplifying a configuration in which the computer 1 is connected to the QR code printer 10 and the print data is transmitted from the computer 1. However, any digital camera, mobile phone or hand-held computer and handy terminal, for example, having such a function may be connected to the QR code printer 10 to obtain the same advantages, if only these devices are information processors capable of outputting character data, such as alphameric characters, Japanese characters (Kanji) and symbols.

Ninth Embodiment

Referring to FIGS. 4, 5, 6, and 22, a ninth embodiment of the present invention will now be described.

According to the ninth embodiment, a QR code reader 20 has a configuration which is able to decode the QR code Q printed by the QR code printer 10 described in the ninth embodiment. The QR code reader 20 is configured so that an ordinary QR code (one in which disclosure data codes are located before an end ID code) can also be decoded. It should be appreciated that the configuration of the QR code Q that can be decoded by the QR code reader 20 has already been described with reference to FIGS. 21A to 21E and FIG. 4. Therefore, the description is omitted herein.

The present embodiment adopts the QR code reader 20 already described as its configuration in FIG. 5, so that each component of the QR code reader 20 is operative in the same way as described.

Figure 22:
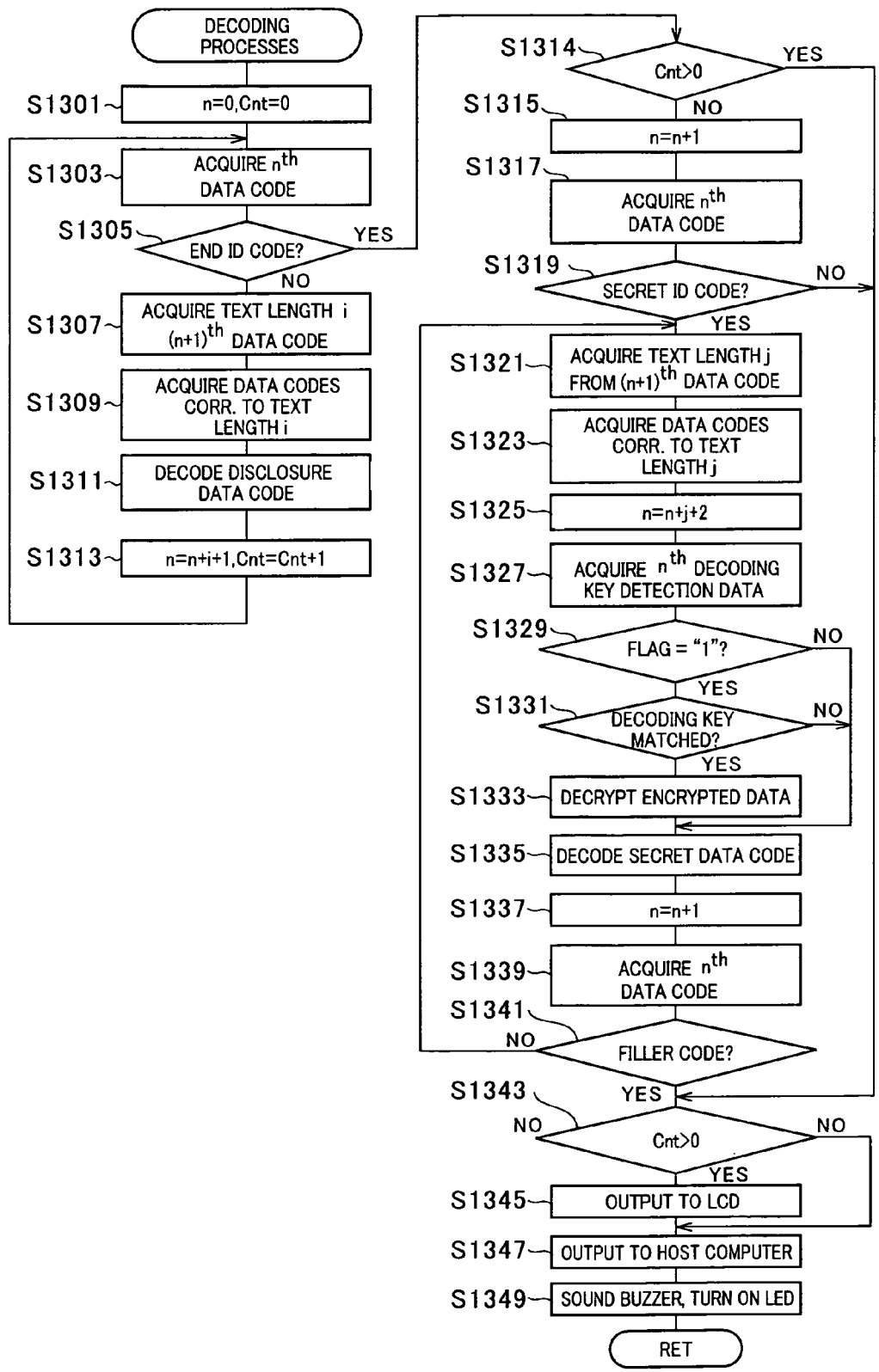
FIG. 22 is a flow diagram illustrating a flow of secondary decoding processes according to a ninth embodiment of the present invention.

Referring to FIGS. 4, 6 and 22, hereinafter are described the decoding processes.

As shown in FIG. 6, the primary decoding processes are started by the control circuit 40 and the memory 35 which are activated when the QR code reader 20 is switched on. This primary decoding processes are the same as those described before.

Hence, when the error correction has been performed correctly ("OK" at step S223), control then proceeds to step S300 where the secondary decoding processes are performed.

Details of S300 are illustrated in FIG. 22. Hereinafter, referring to FIG. 22, the secondary decoding processes are described. As shown in FIG. 22, in the secondary decoding processes, "0" (zero) is set first to counters n and Cnt at step S1301. In the present secondary decoding processes, the counter n functions as a variable for indicating an order of the data codes constituting the QR code Q. The counter Cnt functions as a variable for indicating the number of disclosure data codes contained such as in an ordinary QR code.

At step S1303, an $n^{th}$ data code indicated by the counter n is acquired. At the subsequent step S1305, it is determined whether or not the $n^{th}$ data code acquired at step S1303 is the end ID code. If the data code is determined as being the end ID code ("Yes" at step S1305), the read-out QR code may be the QR code Q produced in the ninth embodiment, or the read-out QR code may not include normal data codes, any more, to be located before the end ID code. Thus, control proceeds to step S1315.

Meanwhile, if the data code cannot be determined as being the end ID code ("No" at step S1305), the read-out QR code may not be the QR code Q produced in the eighth embodiment but may be an ordinary QR code. This means that the QR code still have normal data codes after this $n^{th}$ data code in question. Thus, control proceeds to step S1307 where the subsequent data code, i.e. an $(n+1)^{th}$ data code, or the number of codes (text length) i, is acquired. As described in the eighth embodiment referring to FIG. 21C, this is based on the matter that the text length is stored in a position corresponding to the second one of the data codes. The details are described in "8.4 Encoding of Data" of JIS basic specification (JIS X 0510: 2004).

After acquiring the text length i at step S1307, the data codes corresponding to the text length i are acquired at the subsequent step S1309. Then, at step S1311, the data codes, that is, the disclosure data codes (data codes encoded as codewords representing data to be disclosed) are decoded.

After completing the decoding process at step S1311, control proceeds to step S1313 where "n+i+1" is set to the counter n so that the counter n can indicate the subsequent data code, and "Cnt+1" is set to the counter Cnt so that the counter Cnt can increment the number of the disclosure data codes by 1. Then, control returns to step S1303 to acquire the $n^{th}$ data code.

In this way, at steps S1303 to S1313, normal data codes located before the end ID code and should originally be decoded (first data codes, or disclosure data codes), are acquired and decoded.

When it is determined, at step S1305, that the acquired $n^{th}$ data code is an end ID code ("Yes" at step S1305), control proceeds to step S1314 where a determination is made whether or not the value of the counter Cnt has exceeded "0" (zero).

Specifically, if the value of the counter Cnt for counting the disclosure data codes has exceeded "0" (zero) ("Yes" at step S1314), this means that the read-out QR code contains the disclosure data codes. Thus, control proceeds to step S1343, skipping steps S1315 to S1341 for performing processes associated with the secret data codes. In this way, since it can be determined whether or not the disclosure data codes (first data codes) are located before the end ID code, the control circuit 40 and the like for executing the process of step S1314 may correspond to the "first data code determining means" recited in the claims.

On the other hand, when the value of the counter Cnt has not exceeded "0" (zero) ("No" at step S1314), that is, when the value of the counter Cnt is "0" (zero), this means that the read-out QR code does not contain the disclosure data codes.

In this case, control proceeds to step S1315 where "n+1" is set to the counter n. Then, at step S1317, the $n^{th}$ data code is acquired.

At the subsequent step S1319, it is determined whether or not the $n^{th}$ data code acquired at step S1317 is a secret ID code. This can determine whether or not any secret data codes (second data codes) are present after the end ID code. Thus, the control circuit 40 and the like executing the process of step S1319 may correspond to "the second data code determining means" recited in the claims.

When the data code is determined as being the secret ID code ("Yes" at step S1319), it means that the secret data codes are present immediately after the secret ID code. In this case, control proceeds to step S1321 where the subsequent data code, i.e. $(n+1)^{th}$ data code, or the number of codes (text length) j, is acquired. Similar to step S1309, this is based on the matter that at the text length is stored in a position corresponding to the second one of the data codes.

When it is determined at step S1319 that the secret ID code is present, the presence of the secret ID code in the QR code Q may be ensured to be informed to the host computer HST, for example. Thus, the host computer can grasp the fact that the data codes subsequent to the end ID code are secret data codes. It may happen that data codes which are neither filler codes nor secret data codes (e.g., garbled filler codes which are no longer filler codes) may be located in the code region (vacant portion of the code region) after the end ID code, where only the filler codes should originally be located. In such a case, the information of the codes as being the secret data codes will not be outputted to the host computer HST. Therefore, the occurrences of malfunction can be prevented, which malfunction would have otherwise been caused by decoding data codes other than the secret data codes.

If the data code cannot be determined as being the secret ID code ("No" at step S1319), it means that no secret data codes are present after this $n^{th}$ data code in question in the QR code Q. Then, the present secondary decoding processes are ended, or step S1300 of in FIG. 6 is ended to end the primary decoding processes.

After acquiring the text length j at step S1321, control proceeds to step S1323 where data codes corresponding to the text length j are acquired. Then, at step S1325, "n+j+2" is set to the counter n so that the counter n can indicate the subsequent data code, i.e. a secret data code. After that, at step S1327, the $n^{th}$ decoding key detection data (key identifying information) is acquired.

At the subsequent step S1329, it is determined whether or not the predetermined flag mentioned above has been set to "1", that is, it is determined whether or not the secret data code of the QR code Q is to be decoded using the decoding key. If the flag has not been set to "1" ("No" at step S1329), processes at steps S1331 and S1333 are skipped, and control proceeds to step S1335 as no decoding is required.

If the flag has been set to "1" ("Yes" at step S1329), it means that decoding with the decoding keys is required. Thus, it is determined at step S1331 whether or not the decoding key received from the host computer HST matches the key for decrypting the encrypted data of the $n^{th}$ secret data code, on the basis of the decoding key detection data acquired at the previous step S1327.

If the decoding key is determined at step S1331 as being matched ("Yes" at step S1331), the encrypted data is decrypted at the subsequent step S1333. The cryptography used here is the known composite visual cryptography (composite visual secret distribution process) mentioned in the eighth embodiment. Thus, even when the encrypted data of the secret data code is based on the composite visual cryptography, the encrypted data can be decoded and restored to the original plain text. It should be appreciated that the control circuit 40 and the like executing the process of step S1333 may correspond to the "decoding means" recited in the claims.

If the decoding key cannot be determined, at step S1331, as being matched ("No" at step S1331), the process at step S1333 is skipped without decrypting the $n^{th}$ secret data code, and control proceeds to step S1335. Thus, in the case where the decoding key possessed by the QR code reader 20 is not the one that enables decryption of the $n^{th}$ secret data code, the $n^{th}$ secret data code is neither decrypted nor decoded. Accordingly, unnecessary and overlapped processes can be suppressed from being performed. It should be appreciated that the control circuit 40 and the like executing the process of step S1331 may correspond to the "key matching determining means".

At step S1335, the secret data code is decoded. In other words, since the encrypted data has been decrypted at the previous step S1333, or the data has not originally been encrypted, the secret data code corresponding to a plain text is decoded.

After finishing the decoding process at step S1335, control proceeds to step S1337 where "n+1" is set to the counter n so that the counter n can indicate the subsequent data code. Then, at the subsequent step S1339, the $n^{th}$ data code is acquired.

At step S1341, it is determined whether or not the $n^{th}$ data code acquired at step S1339 is a filler code. If the $n^{th}$ data code is a filler code ("Yes" at step S1341), it means that secret data codes are not present any more in the QR code Q, and control proceeds to the subsequent step S1343.

If it is not determined, at step S1341, that the $n^{th}$ data code is a filler code ("No" at step S1341), it means that the $n^{th}$ data code is the secret data code. In this case, control proceeds to step S1321 where the $(n+1)^{th}$ data code, or the test length j, is again acquired, which is followed by the same processes as described above.

In this way, data codes which should not originally be decoded can be decoded at steps S1317, S1321 to S1327, S1333 and S1335. Specifically, data codes located after the end ID code (second data codes, or secret data codes), are acquired and processed at these steps. Thus, the control circuit 40 and the like executing the processes of these steps may correspond to the "decoding means" recited in the claims.

At step S1343, it is determined whether or not the value of the counter Cnt has exceeded "0" (zero). In particular, when the value of the counter Cnt counting the number of the disclosure data codes has exceeded "0" (zero) ("Yes" at step S1343), it means that the read-out QR code contains the disclosure data codes. Thus, the disclosure data decoded at step S1311 are outputted to the LCD 46 at the subsequent step S1345.

On the other hand, when the value of the counter Cnt counting the number of the disclosure data codes has not exceeded "0" (zero), or equals to "0" (zero) ("No" at step S1343), it means that the read-out QR code does not contain any disclosure data codes. In this case, the outputting process of the subsequent step S1345 is skipped and control proceeds to step S1347.

At step S1347, the disclosure data and the secret data are outputted to the host computer HST. Specifically, when disclosure data codes are present in the read-out QR code, the disclosure data codes are decoded and outputted to the host computer HST. When secret data codes are present in the read-out QR code, the secret data codes are decoded and outputted to the host computer HST. In the case where the host computer HST is not connected to the QR code reader 20, no outputting process has to be performed at step S1347, and control proceeds to step S1349.

At the subsequent step S1349, buzzer 44 is sounded and the LED 43 is lit. Specifically, the operator operating the QR code reader 20 is notified that the disclosure data codes and the secret data codes contained in the read-out QR code have been decoded. In the present embodiment, even when a coding key cannot be determined, at step S1331, as being matched ("No" at step S1331), the operator is notified by the buzzer 44 and the LED 43 that the QR code has been decoded by the QR code reader 20. Upon completion of the process of step S1349, the secondary decoding processes are ended, or step S1300 of FIG. 6 is ended. Thus, the series of primary and secondary decoding processes are ended.

In this way, even when the decoding key is not the one that enables decoding, the operator is notified the completion of the reading. In other words, it is ensured that the operator hardly notices the fact that the QR code contains secret data that cannot be decoded. Also, the operator does not have to conduct a useless operation of repeatedly reading the QR code that cannot be decoded because the coding key is not matched. Accordingly, it is unlikely that the operator is inadvertently motivated to make an attempt of decrypting the QR code. As a result, the security and operability can be enhanced.

As described above, in the QR code reader 20 according to the ninth embodiment of the present invention, it is determined, at step S1314, whether or not disclosure data codes (first data codes) are present before the end ID code. Then, it is determined at step S1319 whether or not secret data codes (second data codes) are present after the secret ID code. When the disclosure data codes are determined at step S1314 as being absent ("No" at step S1314) and when the secret data codes are determined, at step S1319, as being present ("Yes" at step S1319), the secret data codes are decoded at steps S1321 to S1341.

Thus, in the case where the disclosure data codes which should originally be located in the data region are not present, and the secret data codes are present in the code region after the end ID code (vacant portion of the code region) where only filler codes should originally be located, these secret data codes can be decoded. Specifically, the data codes that are present in the vacant portion of the code region, where codewords should be located, can be decoded. In other words, the QR code Q can be decoded, in which the end ID code is initially located in the code region and the secret data codes are located after the end ID code.

More specifically, the QR code Q printed by the QR code printer 10 of the eighth embodiment can be decoded, in which the end ID code is located in the initial portion of the code region (head of the data codes that should be located in the code region), and the secret data codes are located after the end ID code.

In the decoding processes described above, it has been so configured that the $n^{th}$ decoding key detection data is acquired at step S1327. Alternatively, as described referring to FIG. 21D in the eighth embodiment, when the decoding key per se is added to the secret data code, the $n^{th}$ decoding key may be acquired at step S1327. Thus, even when the QR code reader 20 does not have decoding keys (keys enabling decoding) of secret data codes, the secret data codes can be decoded to restore the original plain text. In this case, the control circuit 40 and the like executing the process of "acquiring the nth decoding key" may correspond to the "key separating means" recited in the claims.

When the secret data codes are encrypted with different encrypting keys, the decoding key added to each of the secret data codes can be ensured to acquire the $n^{th}$ decoding key at step S1327. Thus, even when the QR code reader 20 does not have decoding keys for secret data codes, the secret data codes can be decoded and the original plain text can be restored.

Further, in the decoding processes described above, the $n^{th}$ decoding key detection data has been adapted to be acquired at step S1327. There may be a case, for example, where the "start position" as the position information is added to the secret data code as described referring to FIG. 21D in the eighth embodiment. In such a case, the "start position" may be separated from the secret data code, at step S1329, and the secret data having the decoded secret data code may be located in the data record so as to have the positional relationship before encoding, on the basis of the separated "start position". Thus, even when data before being encoded as codewords, are disorderly located in a positional relationship in the data record, the decoded data can be located in the data record so as to have the positional relationship before encoding, on the basis of the position information.

In the decoding processes described above, the presence of the disclosure data codes has been determined at step S1314. If the disclosure data are present ("Yes" at steps S1314), the processes concerning the secret data codes at steps S1315 to S1341 have been skipped, and the decoded disclosure data have been displayed at step S1345. Alternatively, without performing the determining process at step S1314, control may directly proceed from step S1305 to step S1315. Thus, even when the disclosure data are present, the processes concerning the secret data codes at steps S1315 to S1341 are performed. Accordingly, when the QR code Q contains both the disclosure and secret data codes, both of these data codes can be decoded.

The present invention may be embodied in several other forms without departing from the spirit thereof. The embodiments and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A method of producing, in a code producing device including at least a microcomputer, a two-dimensional code having a code area in which a plurality of data blocks each consisting of a plurality of cells is mapped, comprising steps of:

first arranging, by the microcomputer, first type of data codes, the first type of data codes being coded as codewords and indicating data to be disclosed publicly;

adding an end identification code successively from a code string composed of the first type of data codes, the end identification code showing an end of the code string;

determining whether or not it is required to map second type of data codes in a code area, the second type of data codes being coded as the codewords and kept in secret;

arranging a secret identification code successively from the end identification code when it is determined that it is required to map the second types of data codes, the secret identification code showing that the data codes succeeding the secret identification code are the second type of data codes;

second arranging the second type of data codes successively from the secret identification code;

arranging filler codes after the second type of data codes such that the code area is filled up with the filler codes when a total amount of the codewords mapped in the code area is less than an amount of codewords allowed to be mapped maximally in the code area, the filler codes showing no data to read; and producing the first type of data codes, the end identification code, the secret identification code, the second type of data codes, and the filler codes, into the cells mapped in the code blocks in the code area of the two-dimensional code such that a general purpose reader, which interprets code produced after the end identification code as filler, will not recognize the second type of data codes.

2. The method of claim 1, wherein
the second arranging includes a step of encrypting the second type of data codes.

3. The method of claim 2, wherein
the second type of data codes include information specifying a key to decrypt the encrypted second type of data codes.

4. The method of claim 2, wherein
the second type of data codes include a key to decrypt the encrypted second type of data codes.

5. The method of claim 2, wherein
the second type of data codes are composed of a plurality of data codes encrypted on different keys, code by code, and each encrypted data code includes information specifying a key to decrypt each encrypted data code.

6. The method of claim 2, wherein
the second type of data codes are composed of a plurality of data codes encrypted on different keys, code by code, and each encrypted data code includes a key to decrypt each encrypted data code.

7. The method of claim 1, wherein,
when the data to be disclosed and the data to be kept in secret are positionally mixed data records before being coded into the codewords, the second type of data codes include information showing a positional relationship in the data records.

8. The method of claim 1, wherein
the end information code is arranged at a start position of the code area when the first type of data codes are zero in number.

9. The method of claim 8, wherein
the second arranging includes a step of encrypting the second type of data code.

10. The method of claim 9, wherein
the second type of data codes include information specifying a key to decrypt the encrypted second type of data codes.

11. The method of claim 9, wherein
the second type of data codes include a key to decrypt the encrypted second type of data codes.

12. The method of claim 9, wherein
the second type of data codes are composed of a plurality of data codes encrypted on different keys, code by code, and each encrypted data code includes information specifying a key to decrypt each encrypted data code.

13. The method of claim 9, wherein
the second type of data codes are composed of a plurality of data codes encrypted on different keys, code by code, and each encrypted data code includes a key to decrypt each encrypted data code.

14. An apparatus for reading a two-dimensional code having a code area in which a plurality of data blocks each consisting of a plurality of cells is mapped,
wherein the cells include
cells composed of the first type of data codes to be disclosed publicly, the first type of data codes being coded as codewords;
cells composed of an end identification code mapped successively from a code string composed of the first type of data codes, the end identification code showing an end of the code string;
cells composed of a secret identification code mapped successively from the end identification code, the secret identification code showing that the data codes succeeding the secret identification code are second type of data codes, the second type of data codes being coded as the codewords and kept in secret;
cells composed of the second type of data codes mapped successively from the secret identification code; and
cells composed of filler codes mapped after the second type of data codes such that the code area is filled up with the filler codes when a total amount of the codewords mapped in the code area is less than an amount of codewords allowed to be mapped maximally in the code area, the filler codes showing no data to read,
the cells being arranged in the code area such that a general purpose reader, which interprets cells positioned after the cells composed of the end identification code as filler, will not recognize the second type of data codes,
the apparatus comprising:
first decoding means for decoding the first type of data codes which are mapped;
data code determining means for determining whether or not the second type of data codes are mapped, using the secret identification code; and
second decoding means for decoding the second type of data codes when it is determined by the data code determining means that the second type of data codes are mapped.

15. The apparatus of claim 14,
the apparatus comprising
identification code determining means for determining whether or not the secret identification code is mapped; and
information output means for outputting information indicating that the second type of data code is the data codes to be kept in secret when it is determined by the identification code determining means that the secret identification code is mapped.

16. The apparatus of claim 14, wherein
the second type of data codes are encrypted, the apparatus comprising decrypting means for decrypting the second type of data codes using a key to decrypt the second type of data codes.

17. The apparatus of claim 16, comprising
means for having the key to decrypt the second type of data codes.

18. The apparatus of claim 16, wherein
information to specify the key is added to the second type of data codes,
the apparatus comprising
key determining means for determining whether or not a key owned by the apparatus corresponds to the key to decrypt the second type of data codes based on the information, and
means for allowing the decrypting means to decrypt the second type of data codes only when it is determined by the key determining means that the key owned by the apparatus corresponds to the key to decrypt the second type of data.

19. The apparatus of claim 18, wherein
the second type of data codes are composed of a plurality of data codes encrypted on different keys, code by code, and
each encrypted data code includes information specifying a key to decrypt each encrypted data code, and
the key determining means is configured to determine whether or not the key owned by the apparatus corresponds to the key to decrypt the second type of data codes based on the information.

20. The apparatus of claim 16, wherein
the key is added to the second type of data codes,
the apparatus comprising
key separating means for separating the key from the second type of data codes, the separated key being provided to the decrypting means to decrypt the second type of data codes using the separated key.

21. The apparatus of claim 20, wherein
the second type of data codes are composed of a plurality of data codes encrypted on different keys, code by code, and each encrypted data code includes a key to decrypt each encrypted data code, and
the key separating means is configured to separate the key from each of the second type of data codes.

22. The apparatus of claim 14, wherein
the second type of data codes include information showing a positional relationship in data records in which the data to be disclosed and the data to be kept in secret are positionally mixed before being coded into the codewords,
the apparatus comprising
information separating means for separating the positional information from the second type of data codes and
data mapping means for mapping the second type of data codes decoded by the second decoding means into the data records based on the positional information separated by the information separating means.

23. The apparatus of claim 14, wherein
further comprising first determining means for determining whether or not there is the first type of data codes before the end identification code in the code area,
wherein the second decoding means is configured to decode the second type of data codes when it is determined by the first determining means that there is no first type of data codes in the code area and it is determined by the data code determining means that there is the second type of data codes in the code area.

24. The apparatus of claim 23, further comprising
identification code determining means for determining whether or not the secret identification code is mapped; and
information output means for outputting information indicating that the second type of data code is the data codes to be kept in secret when it is determined by the identification code determining means that the secret identification code is mapped.

25. The apparatus of claim 24, wherein
the second type of data codes are encrypted,
the apparatus comprising decrypting means for decrypting the second type of data codes using a key to decrypt the second type of data codes.

26. The apparatus of claim 25, comprising
means for having the key to decrypt the second type of data codes.

27. The apparatus of claim 25, wherein
information to specify the key is added to the second type of data codes,
the apparatus comprising
key determining means for determining whether or not a key owned by the apparatus corresponds to the key to decrypt the second type of data codes based on the information, and
means for allowing the decrypting means to decrypt the second type of data codes only when it is determined by the key determining means that the key owned by the apparatus corresponds to the key to decrypt the second type of data.

28. The apparatus of claim 27, wherein
the second type of data codes are composed of a plurality of data codes encrypted on different keys, code by code, and each encrypted data code includes information specifying a key to decrypt each encrypted data code, and the key determining means is configured to determine whether or not a key owned by the apparatus corresponds to the key to decrypt the second type of data codes based on the information.

29. The apparatus of claim 27, comprising
informing means for informing an operator of completion of reading the two-dimensional code when it is determined by the key determining means that the key owned by the apparatus does not correspond to the key to decrypt the second type of data codes.

30. The apparatus of claim 25, wherein
the key is added to the second type of data codes,
the apparatus comprising
key separating means for separating the key from the second type of data codes, the separated key being provided to the decrypting means to decrypt the second type of data codes using the separated key.

31. The apparatus of claim 30, wherein
the second type of data codes are composed of a plurality of data codes encrypted on different keys, code by code, and each encrypted data code includes a key to decrypt each encrypted data code, and
the key separating means is configured to separate the key from each of the second type of data codes.

32. The two-dimensional code of claim 14, wherein
the two-dimensional code is either printed or displayed on a display unit.

33. A method of producing, in a code producing device including at least a processor, a two-dimensional code having a code area in which a plurality of data blocks each consisting of a plurality of cells is mapped, comprising steps of:
first arranging, in the processor, first type of data codes, the first type of data codes being coded as the codewords and indicating data to be disclosed publicly;
adding end identification information to a predetermined position of a code string composed of the first type of data codes, the end identification information specifying an end position of the code string;
determining whether or not it is required to map second type of data codes in the code area, the second type of data codes being coded as the codewords and kept in secret;
adding a secret identification code successively from the code string when it is determined by the determining step such that it is required to map the second types of data codes, the secret identification code showing that the data codes succeeding the secret identification code are the second type of data codes;
second arranging the second type of data codes successively from the secret identification code;
adding predetermined codes after the second type of data codes such that the code area is filled up with the predetermined codes when a total amount of the codewords mapped in the code area is less than an amount of codewords allowed to be mapped maximally in the code area, the predetermined codes serving as a filler and showing no data to read; and producing the code string composed of the first type of data codes, the end identification information, the secret identification code, the second type of data codes, and the predetermined codes, into the cells mapped in the code blocks in the code area of the two-dimensional code such that a general purpose reader, which interprets code produced after the end identification information as filler, will not recognize the second type of data codes.

34. The method of claim 33, wherein
the second mapping step includes a step of encrypting the second type of data code.

35. The method of claim 34, wherein
the second type of data codes include information specifying a key to decrypt the encrypted second type of data codes.

36. The method of claim 34, wherein
the second type of data codes include a key to decrypt the encrypted second type of data codes.

37. The method of claim 34, wherein
the second type of data codes are composed of a plurality of data codes encrypted on different keys, code by code, and each encrypted data code includes information specifying a key to decrypt each encrypted data code.

38. The method of claim 34, wherein
the second type of data codes are composed of a plurality of data codes encrypted on different keys, code by code, and
each encrypted data code includes a key to decrypt each encrypted data code.

39. The method of claim 33, wherein,
when the data to be disclosed and the data to be kept in secret are positionally mixed in data records before being coded into the codewords, the second type of data codes include information showing a positional relationship in the data records.

40. An apparatus for reading a two-dimensional code having a code area in which a plurality of data blocks each consisting of a plurality of cells is mapped, wherein
the cells include
cells composed of first type of data codes to be disclosed publicly, the first type of data codes being coded as codewords;
cells composed of end identification information added to a predetermined position of a code string composed of the first type of data code, the end identification information specifying an end position of the code string;
cells composed of a secret identification code mapped successively from the code string, the secret identification code showing that the data codes succeeding the secret identification code are second type of data codes, the second type of data codes being coded as the codewords and kept in secret;
cells composed of second type of data codes mapped successively from the code string; and
cells composed of predetermined codes mapped successively from the second type of data codes such that the code area is filled up with the predetermined codes when a total amount of the codewords mapped in the code area is less than an amount of codewords allowed to be mapped maximally in the code area, the predetermined codes serving as a filler and showing no data to read,
the cells being arranged in the code area such that a general purpose reader, which interprets cells positioned after the cell composed of the end identification information as filler, will not recognize the second type of data codes,
the apparatus comprising:
first decoding means for decoding the first type of data codes which are mapped according to the end identification information;
data code determining means for determining whether or not the second type of data codes are mapped after the end position of the code string, based on the end identification information and the secret identification code; and
second decoding means for decoding the second type of data codes when it is determined by the data code determining means that the second type of data codes are mapped.

41. The apparatus of claim 40, further comprising
identification code determining means for determining whether or not the secret identification code is mapped; and
information output means for outputting information indicating that the second type of data code is the data codes to be kept in secret when it is determined by the identification code determining means that the secret identification code is mapped.

42. The apparatus of claim 40, wherein
the second type of data codes are encrypted,
the apparatus comprising decrypting means for decrypting the second type of data codes using a key to decrypt the second type of data codes.

43. The apparatus of claim 42, comprising
means for having the key to decrypt the second type of data codes.

44. The apparatus of claim 42, wherein
information to specify the key is added to the second type of data codes,
the apparatus comprising
key determining means for determining whether or not a key owned by the apparatus corresponds to the key to decrypt the second type of data codes based on the information, and
means for allowing the decrypting means to decrypt the second type of data codes only when it is determined by the key determining means that the key owned by the apparatus corresponds to the key to decrypt the second type of data.

45. The apparatus of claim 44, wherein
the second type of data codes are composed of a plurality of data codes encrypted on different keys, code by code, and each encrypted data code includes information specifying a key to decrypt each encrypted data code, and
the key determining means is configured to determine whether or not a key owned by the apparatus corresponds to the key to decrypt the second type of data codes based on the information.

46. The apparatus of claim 42, wherein
the key is added to the second type of data codes,
the apparatus comprising
key separating means for separating the key from the second type of data codes, the separated key being provided to the decrypting means to decrypt the second type of data codes using the separated key.

47. The apparatus of claim 46, wherein
the second type of data codes are composed of a plurality of data codes encrypted on different keys, code by code, and each encrypted data code includes a key to decrypt each encrypted data code, and the key separating means is configured to separate the key from each of the second type of data codes.

48. The apparatus of claim 40, wherein the second type of data codes include information showing a positional relationship in data records in which the data to be disclosed and the data to be kept in secret are positionally mixed before being coded into the codewords, the apparatus comprising information separating means for separating the positional information from the second type of data codes and data mapping means for mapping the second type of data codes decoded by the second decoding means into the data records based on the positional information separated by the information separating means.

* * * * *